(12) United States Patent
Abaitancei et al.

(10) Patent No.: US 11,927,203 B2
(45) Date of Patent: Mar. 12, 2024

(54) RENEWABLE ENERGY AND WASTE HEAT HARVESTING SYSTEM

(71) Applicant: A & A International, LLC, Chicago, IL (US)

(72) Inventors: Horia Abaitancei, Brasov (RO); Cornel Mihai, Satu Mare (RO); Stefan Ioana, Germantown, MD (US)

(73) Assignee: A&A International, LLC, Chicago, IL (US)

( * ) Notice: Subject to any disclaimer, the term of this patent is extended or adjusted under 35 U.S.C. 154(b) by 0 days.

(21) Appl. No.: 17/957,583

(22) Filed: Sep. 30, 2022

(65) Prior Publication Data

US 2023/0137320 A1 May 4, 2023

Related U.S. Application Data

(63) Continuation of application No. 16/333,521, filed as application No. PCT/US2017/068039 on Dec. 21, 2017, now Pat. No. 11,473,597.

(Continued)

(51) Int. Cl.
*F15B 1/02* (2006.01)
*F15B 1/22* (2006.01)

(52) U.S. Cl.
CPC .............. *F15B 1/024* (2013.01); *F15B 1/22* (2013.01)

(58) Field of Classification Search
CPC ....... F15B 1/22; F15B 1/024; F15B 2211/212
See application file for complete search history.

(56) References Cited

U.S. PATENT DOCUMENTS 3,666,038 A 5/1972 Hudspeth et al.
3,736,753 A 6/1973 Roth
(Continued)

FOREIGN PATENT DOCUMENTS

CN 101855447 A 10/2010
CN 102449303 A 5/2012
(Continued)

OTHER PUBLICATIONS

"Waste heat recovery unit," Wikipedia, retrieved from https://en.wikipedia.org/wiki/wasteheatrecovery_unit, retrieved on Nov. 17, 2020, 4 pages.

(Continued)

*Primary Examiner* — Abiy Teka

(57) ABSTRACT

A renewable energy and waste heat harvesting system is disclosed. The system includes an accumulator unit having a high pressure accumulator and a low pressure accumulator. At least one piston is mounted for reciprocation in the high pressure accumulator. The accumulator unit is configured to receive, store, and transfer energy from the hydraulic fluid to the energy storage media. The system collects energy from a renewable energy source and transfers the collected energy using the pressurized hydraulic fluid. The system further includes one or more rotational directional control valves, in which at least one rotational directional control valve is positioned on each side of the accumulator unit. Each rotational directional control valve includes multiple ports. The system also includes one or more variable displacement hydraulic rotational units. At least one variable displacement hydraulic rotational unit is positioned adjacent each of the rotational directional control valves.

6 Claims, 15 Drawing Sheets

Related U.S. Application Data

(60) Provisional application No. 62/606,521, filed on Sep. 26, 2017, provisional application No. 62/498,336, filed on Dec. 21, 2016.

(56) References Cited

U.S. PATENT DOCUMENTS

| | | |
|---|---|---|
| 3,945,207 A | 3/1976 | Hyatt |
| 4,204,405 A | 5/1980 | Basham |
| 4,888,949 A | 12/1989 | Rogers |
| 5,101,925 A | 4/1992 | Walker |
| 5,165,245 A | 11/1992 | Agrawal et al. |
| 5,540,052 A | 7/1996 | Sieke et al. |
| 5,634,779 A | 6/1997 | Eysymontt |
| 5,852,933 A * | 12/1998 | Schmidt .............. F16H 61/4096 60/484 |
| 5,899,067 A | 5/1999 | Hageman |
| 6,290,184 B1 | 9/2001 | Paterro |
| 7,549,499 B2 | 6/2009 | Delaney |
| 8,225,606 B2 | 7/2012 | Mcbride et al. |
| 8,616,323 B1 | 12/2013 | Gurin |
| 9,109,614 B1 | 8/2015 | Fong et al. |
| 9,352,743 B2 | 5/2016 | Davis et al. |
| 9,982,690 B2 * | 5/2018 | Jagoda .................. E02F 9/2217 |
| 10,047,768 B2 * | 8/2018 | Quan .................... F15B 13/044 |
| 10,794,370 B2 | 10/2020 | Abaitancei et al. |
| 2002/0060500 A1 | 5/2002 | Lafferty |
| 2004/0107699 A1 * | 6/2004 | Fales ....................... F15B 21/14 60/414 |
| 2007/0227801 A1 | 10/2007 | Loeffler |
| 2008/0104955 A1 * | 5/2008 | Khalil ................... F15B 11/024 60/462 |
| 2008/0276606 A1 | 11/2008 | Petre |
| 2008/0276608 A1 | 11/2008 | Anderson et al. |
| 2009/0008171 A1 | 1/2009 | Hall et al. |
| 2009/0205892 A1 | 8/2009 | Jensen et al. |
| 2009/0236906 A1 | 9/2009 | Walker |
| 2010/0032959 A1 | 2/2010 | Nies |
| 2010/0205960 A1 | 8/2010 | Mcbride et al. |
| 2011/0030361 A1 | 2/2011 | Gopalswamy et al. |
| 2011/0056368 A1 | 3/2011 | Mcbride et al. |
| 2012/0042644 A1 * | 2/2012 | Noack ...................... B60K 6/12 91/437 |
| 2012/0117958 A1 | 5/2012 | Caldwell et al. |
| 2012/0324891 A1 | 12/2012 | Raab et al. |
| 2013/0061589 A1 | 3/2013 | Bauer et al. |
| 2013/0068333 A1 | 3/2013 | Dorr et al. |
| 2014/0166114 A1 * | 6/2014 | Wang ..................... E02F 9/2217 137/12 |
| 2014/0261288 A1 | 9/2014 | Coney et al. |
| 2014/0325974 A1 | 11/2014 | Schulz et al. |
| 2015/0204356 A1 | 7/2015 | Krittian |
| 2016/0348342 A1 * | 12/2016 | Yoo ........................ E02F 9/2242 |
| 2017/0072935 A1 | 3/2017 | Ornella et al. |
| 2017/0292539 A1 | 10/2017 | Bauer et al. |
| 2019/0211809 A1 | 7/2019 | Abaitancei et al. |
| 2019/0305558 A1 | 10/2019 | Abaitancei et al. |
| 2021/0301781 A1 | 9/2021 | Abaitancei et al. |

FOREIGN PATENT DOCUMENTS

| | | |
|---|---|---|
| CN | 202326031 U | 7/2012 |
| WO | 2010094118 A1 | 8/2010 |
| WO | 2018081651 A1 | 5/2018 |

OTHER PUBLICATIONS

Abaitancei et al., "Axial Piston Variable Displacement Hydraulic Rotational Unit With Integrated Propulsion Shaft," U.S. Appl. No. 15/731,383, filed Jun. 5, 2017, 69 pages.

Abaitancei et al., "Brake Energy Active Recovery System for Vehicles," U.S. Appl. No. 62/606,522, filed Sep. 26, 2017, 59 pages.

Abaitancei et al., "Fluid Thermal Unit," U.S. Appl. No. 62/580,360, filed Nov. 1, 2017, 29 pages.

Abaitancei et al., "Gearbox With Integrated Brake Energy Recovery System," U.S. Appl. No. 62/584,650, filed Nov. 10, 2017, 30 pages.

Abaitancei et al., "Hybrid Kinematic Hydraulic Transmission for Use With an Integrated Brake Energy Recovery System," U.S. Appl. No. 62/605,283, filed Aug. 7, 2017, 6 pages.

Abaitancei et al., "Hydraulic Accumulator," U.S. Appl. No. 62/577,630, filed Oct. 26, 2017, 48 pages.

Abaitancei et al., "Integrated Hybrid Energy Conversion and Storage System," U.S. Appl. No. 62/606,511, filed Sep. 26, 2017, 70 pages.

Abaitancei et al., "Integrated Renewable Energy and Waste Heat Harvesting System," U.S. Appl. No. 62/606,521, filed Sep. 26, 2017, 12 pages.

Abaitancei et al., "Offset Radial Piston-Actuated Torque Transfer Device," U.S. Appl. No. 62/598,366, filed Dec. 13, 2017, 64 pages.

Abaitancei et al., "Radial Hydraulic Piston Actuated Torque Transfer Device," U.S. Appl. No. 15/731,271, filed May 15, 2017, 19 pages.

Abaitancei et al., "Radial Hydraulic Piston-Actuated Torque Transfer Device," U.S. Appl. No. 62/598,364, filed Dec. 13, 2017, 51 pages.

Abaitancei et al., "Radial Offset Hydraulic Piston Torque Transfer System," U.S. Appl. No. 62/605,291, filed Aug. 7, 2017, 7 pages.

Abaitancei et al., "Solar Power Aided Pumping System and Wave Generator," U.S. Appl. No. 62/787,028, filed Dec. 31, 2018, 64 pages.

Abaitancei et al., "Thermo-Hydraulic Gravitational Energy Conversion System," U.S. Appl. No. 62/644,138, filed Mar. 16, 2018, 7 pages.

Abaitancei, "Continuous Convection Heat Exchanger," U.S. Appl. No. 62/498,347, filed Dec. 21, 2016, 4 pages.

Abaitancei, "Fluid Power Pressure Wave Pump/Motor (FPPWPM)," U.S. Appl. No. 62/498,337, filed Dec. 21, 2016, 3 pages.

Abaitancei, "Hybrid Energy Recovery System for Vehicle Applications," U.S. Appl. No. 62/498,348, filed Dec. 21, 2016, 2 pages.

Abaitancei, "Hydraulic-Actuated Piston Clutch," U.S. Appl. No. 62/498,349, filed Dec. 21, 2016, 5 pages.

Abaitancei, "Pressure Wave Based Fluid Power Propulsion System," U.S. Appl. No. 62/496,784, filed Oct. 28, 2016, 3 pages.

Abaitancei, "Thermo-Hydraulic Propulsion System," U.S. Appl. No. 62/498,338, filed Dec. 21, 2016, 1 page.

Abaitancei, "Variable Sonic Resonator for Fluid Power Applications," U.S. Appl. No. 62/498,336, filed Dec. 21, 2016, 2 pages.

Abaitencei et al., "Integrated Brake and Thermal Energy Recovery System," U.S. Appl. No. 15/731,267, filed May 15, 2017, 67 pages.

Abaitencei et al., "Thermo-Hydraulic Pressure Wave Based Propulsion System," U.S. Appl. No. 15/731,360, filed Jun. 1, 2017, 51 pages.

* cited by examiner

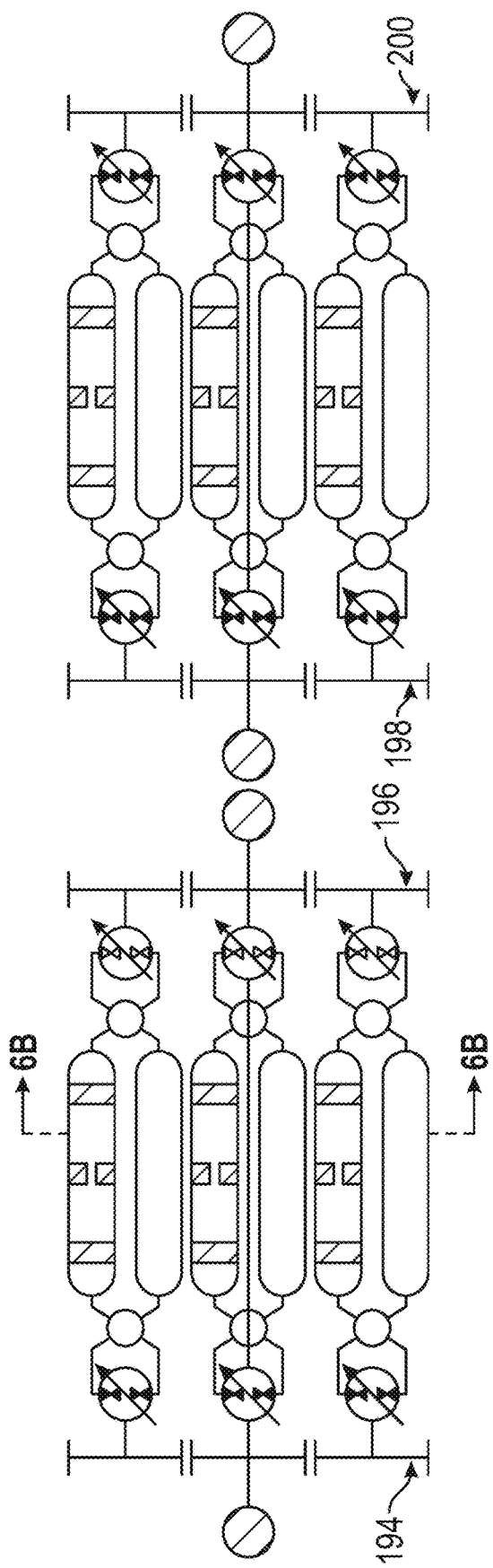
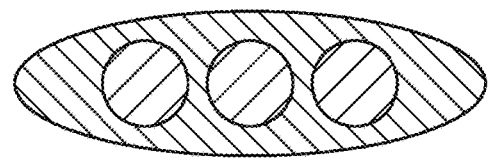
FIG. 6A
FIG. 6B

RENEWABLE ENERGY AND WASTE HEAT HARVESTING SYSTEM

CROSS-REFERENCE TO RELATED APPLICATIONS

This application is a continuation of U.S. patent application Ser. No. 16/333,521, filed Mar. 14, 2019, which is a national stage application under 35 U.S.C. § 371 of International Application No. PCT/US2017/068039, filed Dec. 21, 2017, which claims the benefit of the filing date of Romanian Patent Application A/2017/01156, filed Dec. 20, 2017, and claims the benefit of priority to U.S. Provisional Application No. 62/606,521, filed Sep. 26, 2017, and U.S. Provisional Application No. 62/498,336, filed Dec. 21, 2016, all of which are hereby expressly incorporated by reference in their entireties.

TECHNICAL FIELD

The present disclosure relates to an energy conversion, transfer, and storage system and, in particular, energy conversion, transfer, and storage system that combines different energy sources to efficiently harvest, store, and distribute energy.

BACKGROUND

Description of the Related Art

Current energy conversion systems rely on combustion processes, internal combustion engines, or electrical motors powered by batteries or connected to an electrical network. Such energy conversion systems operate under variable conditions based on energy need and power generation requirements. Internal combustion engines for mobile applications (e.g., vehicles) typically operate in a wide range of power conditions, which results in increased consumption and emissions due to transient operating conditions. Conventional brake energy recovery systems do not solve the efficiency problem due to additional mass and limited usage.

The operation of an engine at a constant speed under different output conditions is a significant efficiency improvement but requires an efficient intermediate energy storage device. Such a device may also improve the efficiency of the device that converts the chemical energy of the fuel into thermal energy and then into mechanical energy.

Conventional stationary energy sources rely on the constant speed of internal combustion engines or gas/steam turbines at electrical generation plants. These systems rely on fuel combustion associated with harmful greenhouse gas emissions. Conversely, renewable energy sources, such as wind, wave and solar, are characterized by large fluctuations in availability, increasing the need for flexibility, integrated complementarity among them, and also for intermediate storage. For example, wind turbines may operate based on an electrical generator placed on the top of the wind turbine tower that is powered by a propeller, which is actuated by the wind. The generated electrical energy is transmitted from the wind turbine tower to electrical transformers and is then connected to the electrical grid. This arrangement is costly in that an individual generator is positioned on each wind turbine tower and works intermittently in a given power range, such that a-t times of peak wind energy and minimum wind energy, the wind turbine output power is not used. Also electrical connection from the electrical generator to the electrical grid can be inefficient.

Regarding waste heat systems, waste heat is generated by numerous energy conversion devices including power tools and industrial processes. A waste heat recovery unit (WHRU) is an energy recovery heat exchanger that recovers heat from hot fluid streams with potential high energy content, such as hot flue gases from a diesel generator, steam from cooling towers or waste water from different cooling processes such as in steel cooling. Current applications of waste heat recovery rely on transferring the waste heat as thermal energy and using the heat as thermal energy. Some conventional systems convert the waste heat, integrating it as an external heat source, into hydraulic energy to be hydro-mechanically stored and converted. However, conventional waste heat harvesting systems have disadvantages in their operation due to efficiency, usability, flexibility, cost, applicability, weight, packaging, manufacturability, temperature range, recyclability and durability.

Accordingly, there is a continuing need in the art to overcome these shortcomings of conventional systems, and more specifically, to overcome efficiency, packaging, weight, range of applicability, and manufacturing limitations.

BRIEF SUMMARY

A Renewable Energy and Waste Heat Harvesting System is provided to improve the efficiency of energy generation and consumption for systems that rely on variable energy generation or energy consumption. The Renewable Energy and Waste Heat Harvesting System includes double-sided hydraulic units integrated with double-sided hydro-mechanical accumulator units and double-sided directional control valves to capture, store and release energy according to availability and power needs. The Renewable Energy and Waste Heat Harvesting system integrates mechanical, hydraulic and thermal energy sources, releasing energy for multiple mechanical sources at different mechanical parameters and connections, and also releasing energy for electrical storage and consumption.

The Renewable Energy and Waste Heat Harvesting System enables energy systems to adapt to large power ranges in order to cover applicability needs. Additionally, the Renewable Energy and Waste Heat Harvesting System enables energy systems to adapt to renewable energy, which is often characterized by numerous fluctuations. In an integrated manner, the Renewable Energy and Waste Heat Harvesting System includes double-sided hydraulic devices acting as variable displacement hydraulic pumps or motors coupled with directional control valves and double-sided accumulator units. The core structure is extendable for multiple hydraulic inputs and hydraulic actuated mechanical outputs coupled in series and parallel based on the particular application.

Electrical output generation is also integrated. Besides mechanical hydraulic energy generation, thermal energy is also converted into hydraulic energy and then into electrical or mechanical energy, according to the particular application. The thermal energy may be integrating onto any source generated by convection, conduction or radiation. The embodiments are related to improve the efficiency of energy systems such as vehicles and renewable energy sources, allowing them to run at higher efficiencies than current applications due to the intermediate storage capacity and flexible power conversion capabilities given by fluid power. Relying on intermediate energy storage allows applications of alternative conversion systems that might run a-t constant running conditions and consequently at higher efficiencies.

A renewable energy and waste heat harvesting system for harvesting and transferring energy from renewable energy sources is disclosed. The system includes an accumulator unit having a high pressure accumulator and a low pressure accumulator. At least one piston is mounted for reciprocation in the high pressure accumulator. The accumulator unit is configured to receive, store, and transfer energy from the hydraulic fluid to the energy storage media. The system collects energy from a renewable energy source and transfers the collected energy using the pressurized hydraulic fluid. The system further includes two or more rotational directional control valves, in which at least one rotational directional control valve is positioned on each side of the accumulator unit. Each rotational directional control valve includes multiple ports. The system also includes two or more variable displacement hydraulic rotational units. At least one variable displacement hydraulic rotational unit is positioned adjacent each of the rotational directional control valves.

In some implementations, the renewable energy and waste heat harvesting system further includes a first mechanical transmission with a mechanical input coupling connected via a first mechanical shaft to one of the variable displacement hydraulic rotational units of the two or more variable displacement hydraulic rotational units. In other implementations, the renewable energy and waste heat harvesting system further includes a second mechanical transmission with a mechanical output coupling connected via a second mechanical shaft to another of the variable displacement hydraulic rotational units of the two or more variable displacement hydraulic rotational units. In still other implementations, the renewable energy and waste heat harvesting system further includes a hydraulic connector that links the high pressure accumulator with a hydraulic circuit. In yet other implementations, the renewable energy and waste heat harvesting system further comprises a hydraulic connector that links the low pressure accumulator with the hydraulic circuit.

In at least one implementation, the renewable energy and waste heat harvesting system further includes a pressure valve enables hydraulic fluid to be release if peak loads occur to the low pressure accumulator, by way of a connection pipe. In some implementations, the renewable energy and waste heat harvesting system further includes a hydraulic pipe that is used as a bypass connection to the high pressure accumulator. In other implementations of the renewable energy and waste heat harvesting system, the energy storage media is an elastic component. In still other implementations, the renewable energy and waste heat harvesting system further includes a controller that regulates transfer of the recovered energy in the accumulator. In yet other implementations of the renewable energy and waste heat harvesting system, the controller directs pressurized hydraulic fluid to a variable displacement hydraulic rotational unit via a rotational directional control valve.

In at least one implementation of the renewable energy and waste heat harvesting system, the variable displacement hydraulic rotational unit acts as a motor driven by pressurized fluid. In some implementations of the renewable energy and waste heat harvesting system, the system is configured to recover, store, and release energy in a controlled manner based on availability and power requirements. In other implementations of the renewable energy and waste heat harvesting system, the energy source is radiative, electrical, vehicular, wind, wave, solar, or waste heat. In still other implementations of the renewable energy and waste heat harvesting system, the variable displacement hydraulic rotational unit is able to acts as a hydraulic pump. In yet other implementations, the renewable energy and waste heat harvesting system further includes an energy recovery component that recovers energy from multiple energy sources. In at least one implementation, the renewable energy and waste heat harvesting system further includes a thermal unit from which energy is recovered by the system.

In some implementations, a method of obtaining and transferring energy from renewable energy sources using a renewable energy harvesting system is provided. The renewable energy harvesting system includes: (1) an accumulator unit having a high pressure accumulator and a low pressure accumulator, the accumulator unit having a first side and a second side, the high pressure accumulator containing at least one piston mounted for reciprocation therein against an energy storage media, and (2) one or more rotational directional control valves, at least one rotational directional control valve positioned and connected to each side of the accumulator unit, each rotational directional control valve including multiple ports. The method includes: receiving energy in pressurized hydraulic fluid at the accumulator unit, via a port in the rotational directional control valve, from one or more renewable energy input sources; storing energy in the high pressure accumulator by using the pressurized hydraulic fluid to drive the at least one piston in a first direction and compress the energy storage media; and transferring energy from the compressed energy storage media, via expansion of the compressed energy storage media, which drives the at least one piston in a direction opposite of the first direction and drives pressurized hydraulic fluid through a different port in the rotational directional control valve and out of one or more energy output systems.

In another aspect, the one or more renewable energy input sources includes one or more sources of a radiative, electrical, vehicular, wind, wave, solar, and waste heat. In still another aspect, the one or more energy output systems include mechanical output systems, electrical output systems, hydraulic output systems, or combinations thereof. There is an increasing need for efficiency and effectiveness of the energy power storage based on renewables due to fluctuating energy availability, especially for renewable sources, the numerous sources of waste heat, and the potential of coal gasification, as well as fluctuating power consumption. Thus, both energy input sources and energy output sources continue to increase fluctuating power supply and demand.

A renewable energy and waste heat harvesting system captures, stores and releases energy according to variable inputs of primary energy sources and variable outputs relative to power ranges, control manner, number of consumers and nature of delivered energy (mechanical/electrical/thermal/hydraulic). In an automotive embodiment, a brake energy recovery system of a motor vehicle is combined with a hydrostatic transmission extendable to a thermal energy recovery system. In another embodiment, different energy sources, intermediate storage and controlled energy distribution are provided for different consumer applications.

A renewable energy and waste heat harvesting system is provided to integrate different renewable energy sources (e.g., wind, waves, solar, and the like) and waste heat in a common hydraulic-based energy conversion and intermediate storage system. The system connects electromechanical actuators based on different physical principles: mechanical, electrical and hydraulic. Renewable energy sources have a transient character based on availability, and the demand for energy consumption can widely fluctuate. To overcome the variability of both energy sources and power consumption, an intermediate energy conversion and storage system is provided. The system converts different energy sources into a single source that is stored, controlled and converted as needed. The intermediate conversion and storage system is hydraulic-based, overlapping with sonic principles based on power density, controllability and cost effectiveness of fluid power principles.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements, and may have been selected solely for ease of recognition in the drawings.

FIGS. 6A and 6B are schematic views of the Renewable Energy and Waste Heat Harvesting System with double action functionality showing a multiple hydraulic unit structure.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, un-recited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise.

The headings and Abstract of the Disclosure provided herein are for convenience only and do not limit the scope or meaning of the embodiments.

Figure 1:
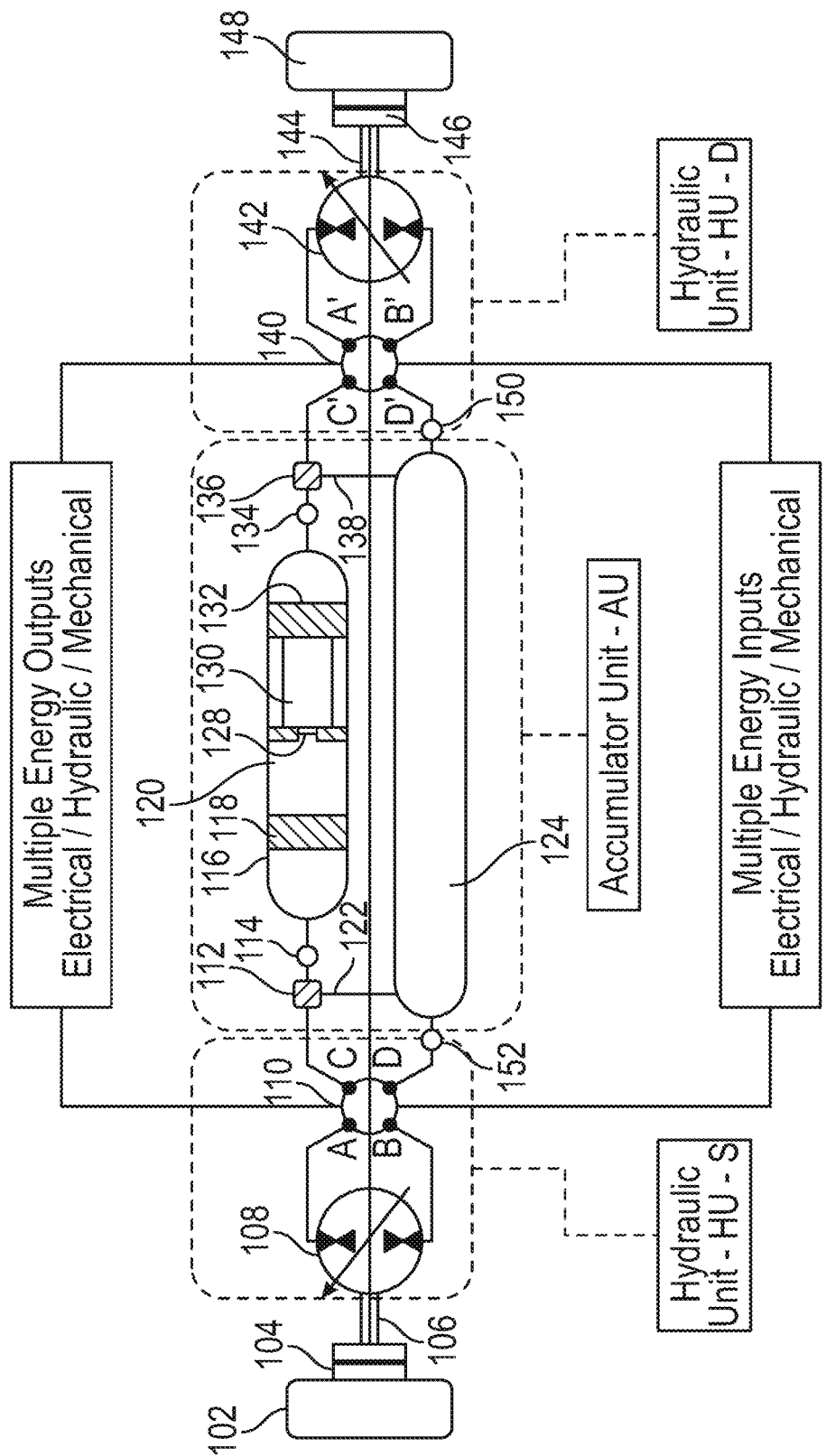
FIG. 1 is a schematic view of the Renewable Energy and Waste Heat Harvesting System with double action functionality that integrates multiple different types of input energy sources, stores the energy hydraulically, and supplies multiple different types of output energy.

As shown in FIG. 1, some implementations of the Renewable Energy and Waste Heat Harvesting System employ integrated mechanical-hydraulic energy conversion. This type of integrated mechanical-hydraulic energy conversion provides the technological improvement of integrating hydraulic units, such as directional control valves and accumulator units. Additionally, the Renewable Energy and Waste Heat Harvesting System incorporates a dual-action configuration that reduces flow speed and hydraulic power loss. Furthermore, the Renewable Energy and Waste Heat Harvesting System integrates different energy sources and energy outputs.

The implementation of the Renewable Energy and Waste Heat Harvesting System shown in FIG. 1 is positioned between a mechanical transmission 102 with a mechanical input coupling 104 on one end and a mechanical transmission 148 with a mechanical output coupling 146 one the other end. In this implementation, the Renewable Energy and Waste Heat Harvesting System achieves the technological functions of active control of the mechanical output parameters, intermediate energy storage, and direct connection of a mechanical input coupling 104 and a mechanical output coupling 146.

Some implementations of the Renewable Energy and Waste Heat Harvesting System utilize the coupling of a variable displacement hydraulic power unit (HU1) connected to the mechanical input coupling 104, with a directional control valve 110 on one side of an accumulator unit (AU). On the other side of the accumulator unit is coupled a directional control valve 140 connected to a variable displacement hydraulic power unit (HU2), which is mechanically connected to the mechanical output coupling 146. A mechanical shaft 106 provides a direct connection to the mechanical input coupling 104 on one end, and a mechanical shaft 144 provides a direct connection of the mechanical output coupling 146 on the other end.

In the Renewable Energy and Waste Heat Harvesting System, the mechanical rotational energy provided by the mechanical couplings 104 and 146 is converted into hydraulic energy by the variable displacement hydraulic power units HU1 and HU2, which direct the hydraulic energy to the accumulator unit AU. The hydraulic energy may then fill the accumulator unit AU. As a result, all or part of the transmitted mechanical energy is stored by the displacement imposed by the variable displacement hydraulic power units HU1 and HU2. When the stored energy within the accumulator unit AU is released, by the displacement of the variable displacement hydraulic power units, the hydraulic energy is converted into mechanical energy and added to the mechanical power transferred between the mechanical input coupling 104 and the mechanical output coupling 146. The directional control valves 110 and 140 switch between input and output of the connections of the hydraulic power units HU1 and HU2 to the accumulator unit AU.

In at least one implementation of the Renewable Energy and Waste Heat Harvesting System, the components of the variable displacement hydraulic power units HU1 and HU2, directional control valves 110 and 140, and accumulator unit AU are integrated, which allows a larger flow path and reduced flow velocities. Accordingly, the Renewable Energy and Waste Heat Harvesting System increases system efficiency by reducing flow losses. An additional benefit of this component integration is significant mass reduction. By having two hydraulic units connected to the accumulator unit, the flow is decreased by a factor of two. Thus, the hydraulic power losses are reduced by a factor of eight (i.e., the cube power of the velocity reduction).

In some implementations, the Renewable Energy and Waste Heat Harvesting System may be configured to extend to multiple energy input sources, as well as multiple mechanical and/or electrical sources. The structure of the system may be extended using a hydraulic input system that includes hydraulic pipes connected between the directional control valves and the hydraulic input system. Additionally, the structure of the Renewable Energy and Waste Heat Harvesting System may be extended by using a sonic electrical generator that includes hydraulic pipes connected between the directional control valves 110 and 140 and the sonic electrical generator. Further, the structure of the Renewable Energy and Waste Heat Harvesting System may be extended by using multiple mechanical outputs.

In at least one implementation, the Renewable Energy and Waste Heat Harvesting System includes a single hydraulic unit, which integrates variable displacement hydraulic rotational unit 108 and the rotational directional control valve 110 with the accumulator unit, which integrating a high pressure accumulator 116 and low pressure accumulator 124. In other implementations, the Renewable Energy and Waste Heat Harvesting System includes dual hydraulic units positioned on opposite sides of the accumulator unit.

In some implementations of the Renewable Energy and Waste Heat Harvesting System, the hydraulic unit HU1 includes the variable displacement hydraulic rotational unit 108 and the rotational directional control valve 110. The variable displacement hydraulic rotational unit 108 acts alternately as a hydraulic pump or motor by transferring mechanical torque that is coupled to the mechanical transmission 102 via the shaft 106 and coupling 104. The hydraulic circuit includes rotational directional control valve 110, which creates flow connections of the inlet and outlet ports A and B, of the variable displacement hydraulic rotational unit 108 with the high pressure accumulator 116 using port C and the low pressure accumulator 124 using port D.

Located within the high pressure accumulator 116 is piston 118 that transfers energy from the hydraulic fluid to energy storage media 120, which is an elastic component. A hydraulic connector 114 links the high pressure accumulator 116 with the hydraulic circuit. A pressure valve 112 enables hydraulic fluid to be release if peak loads occur to the low pressure accumulator 124, by way of connection pipe 122. The low pressure accumulator 124 is connected to the hydraulic circuit by hydraulic connector 126.

In the implementation shown in FIG. 1, the Renewable Energy and Waste Heat Harvesting System has a dual-action configuration. This dual-action configuration is an extension of a single action brake energy recovery system. The dual-action configuration of the Renewable Energy and Waste Heat Harvesting System creates a mechanical torque transfer path between two rotational mechanical transmissions 102 and 148. The dual-action configuration has intermediate energy storage capabilities from the variable displacement hydraulic rotational unit 108 and rotational mechanical transmissions 148, and can change the torque transferred between the rotational mechanical transmissions.

The dual action implementation of the Renewable Energy and Waste Heat Harvesting System uses the hydraulic unit HU2 coupled to the accumulator unit AU in addition to hydraulic unit HU1. The hydraulic unit HU2 has the same construction as hydraulic unit HU1. The hydraulic unit HU2 includes rotational directional control valve 140 and variable displacement hydraulic rotational unit 142, which connect to hydraulic connector 134 of the high pressure accumulator 116, and pressure valve 136 which is connected to the low pressure accumulator 124 using hydraulic pipe 138. The hydraulic unit HU1 is also connected to the low pressure accumulator 124 using hydraulic coupling 150.

In some implementations, the Renewable Energy and Waste Heat Harvesting System also includes a rotational directional control valve 140 which includes ports A' and B' connected to variable displacement hydraulic rotational unit 142, port C' connected to high pressure accumulator 116, and port D' connected to the low pressure accumulator 124. The variable displacement hydraulic rotational unit 142 is connected to mechanical transmission 148 via the mechanical shaft 144 and mechanical output coupling 146.

In a dual action implementation of the Renewable Energy and Waste Heat Harvesting System, the accumulator unit includes a high pressure accumulator 116 and the low pressure accumulator 124. A hydraulic piston 118 is positioned within high pressure accumulator 116 and converts the hydraulic energy of the fluid flow transferred by variable displacement hydraulic rotational unit 108, and controlled by rotational directional control valve 110, to storage media 120. A hydraulic piston 132 is also positioned within the high pressure accumulator 116, and converts the hydraulic energy of the fluid flow transferred by variable displacement hydraulic rotational unit 142, and controlled by rotational directional control valve 140, to storage media 130. Storage media 130 is sustained against the walls and the storage media 120 by supporting wall 128.

In some implementations, the Renewable Energy and Waste Heat Harvesting System further includes multiple energy input sources and multiple energy outputs. Accordingly, in some implementations, the rotational directional control valve 110 includes (in additional to inlet and outlet ports A, B, C and D) multiple energy inputs and multiple energy outputs. Additionally, in some implementations, the rotational directional control valve 140 includes (in additional to inlet and outlet ports A', B', C' and D') multiple energy inputs and multiple energy outputs. In some configurations, the Renewable Energy and Waste Heat Harvesting System includes hydraulic pipes connected between the directional control valves 110, 140 and the multiple energy input sources.

The multiple energy input sources may include, by way of example only, and not by way of limitation: wind energy, wave energy, waste heat energy, solar energy, thermal energy, hydraulic energy, mechanical energy, electrical energy, or combinations thereof. In at least one implementation, a multiple energy input source is a sonic electrical generator that has hydraulic pipes, which are connected between the directional control valves 110, 140 and the sonic electrical generator. The multiple energy outputs may include one or more mechanical outputs, one or more hydraulic outputs, one or more electrical output, or combinations thereof.

Figure 2A:
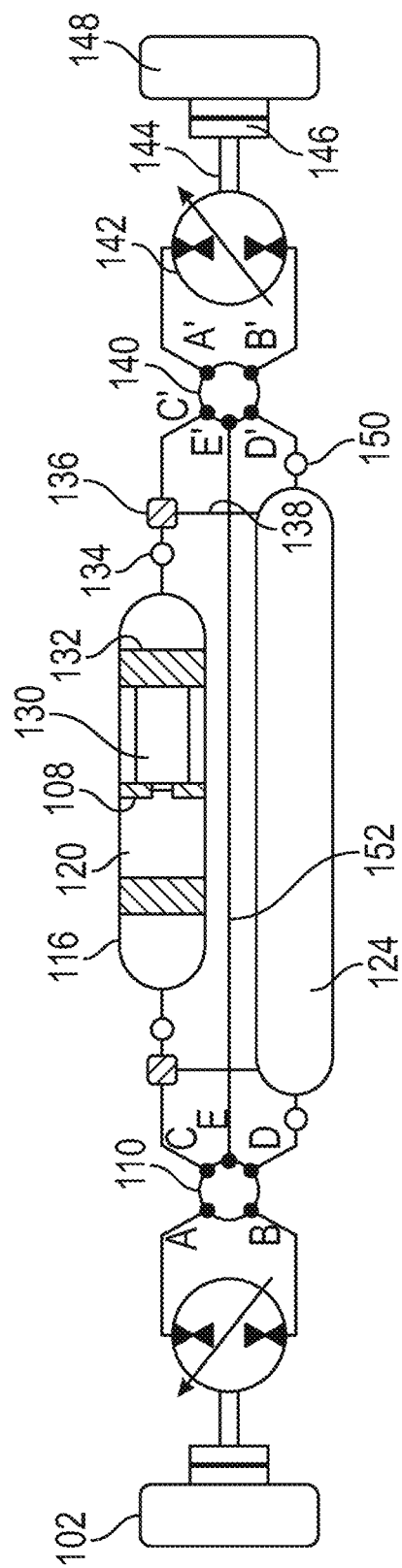
FIG. 2A is a schematic view of the Renewable Energy and Waste Heat Harvesting System with double action functionality showing a structure having an integrated hydrostatic transmission.

Referring now to FIG. 2A, an implementation of the Renewable Energy and Waste Heat Harvesting System is shown with an integrated hydrostatic transmission. The integrated hydrostatic transmission adds the additional capability to the system of integrating a continuous variable transmission between mechanical transmission 102 and mechanical transmission 148. Specifically, a hydraulic pipe 152 is used as a bypass connection to the high pressure accumulator 116. In this implementation, the rotational directional control valve 110 includes an additional port E and rotational directional control valve 140 includes an additional port E'. Hydraulic pipe 152 is connected between ports E and E'.

Figure 2B:
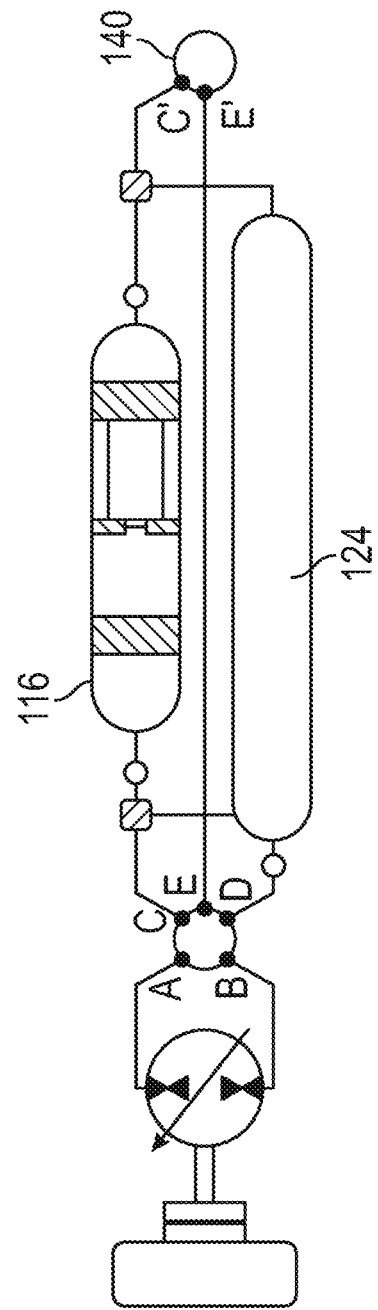
FIG. 2B is a schematic view of the Renewable Energy and Waste Heat Harvesting System with double action functionality showing a single side structure.

In a single sided implementation of the Renewable Energy and Waste Heat Harvesting System, as shown to FIG. 2B, the double action functionality of the accumulator unit is incorporated into a single mechanical transmission. The rotational directional control valve 140 includes port C' connected to high pressure accumulator 116, and a port E' connected to low pressure accumulator 124. This single sided implementation of the Renewable Energy and Waste Heat Harvesting System, does not include the variable displacement hydraulic rotational unit 142, the mechanical shaft 144, the mechanical output coupling 146, or the mechanical transmission 148.

Figure 3:
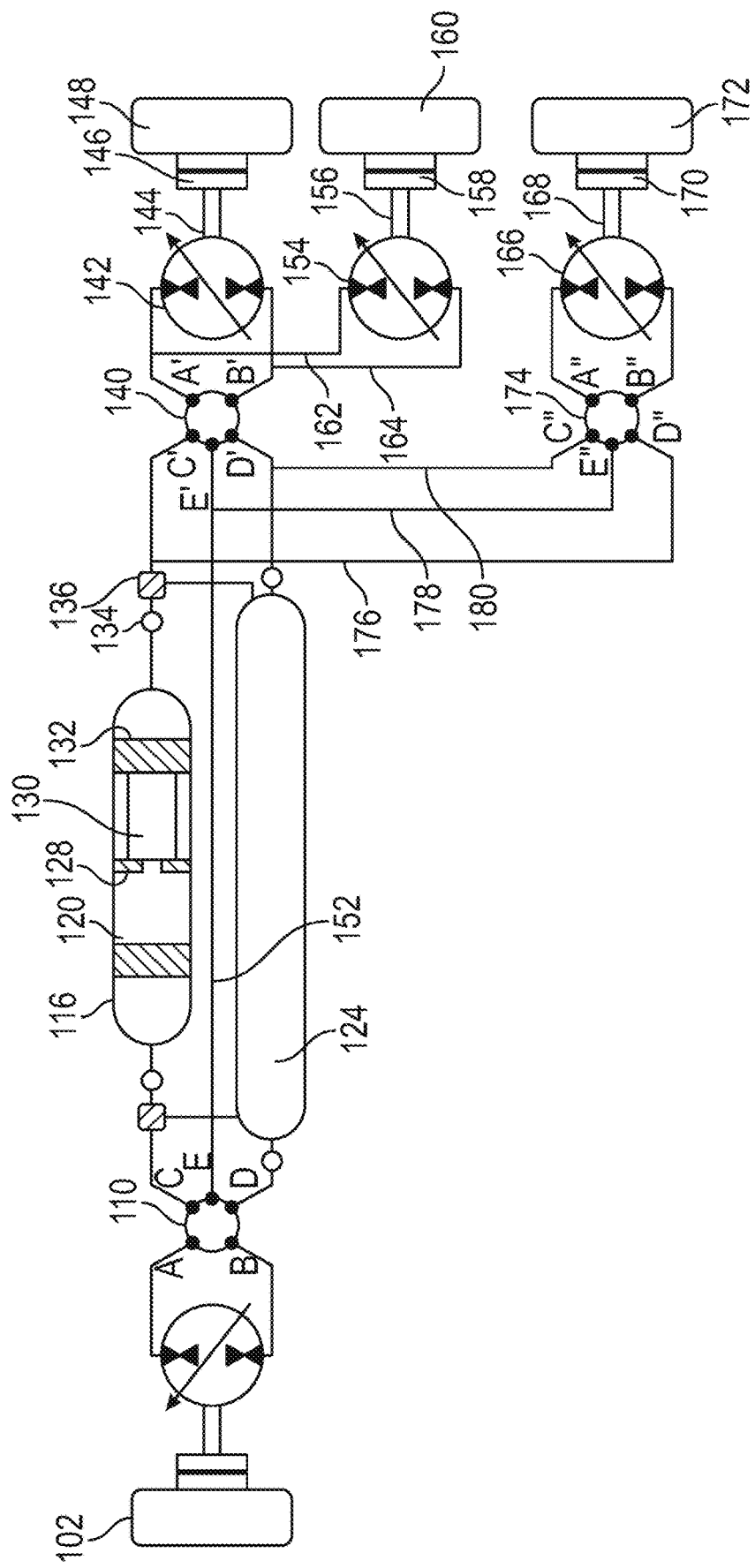
FIG. 3 is a schematic view of the Renewable Energy and Waste Heat Harvesting System with double action functionality showing multiple output structures.

Referring now to FIG. 3, other implementations of the Renewable Energy and Waste Heat Harvesting System are shown with multiple power outputs. In the first implementation, all output actuators are controlled by a single directional control valve. This implementation demonstrates system structures that are hydraulically connected in parallel. For this implementation the hydraulic circuit splits between rotational directional control valve 140 and variable displacement hydraulic rotational unit 142, which establishes a hydraulic circuit to connect additional variable displacement hydraulic rotational unit 154. The hydraulic circuit includes hydraulic pipes 162 and 164. Variable displacement hydraulic rotational unit 154 transfers torque to mechanical transmission 160, using mechanical shaft 156 and mechanical coupling 158.

In the second implementation of the Renewable Energy and Waste Heat Harvesting System, separate control is provided to each output actuator. This implementation includes an additional rotational directional control valve 174, which has similar connecting ports A", B", C", D", E", F" as rotational directional control valve 140. The additional rotational directional control valve 174 is connected using hydraulic pipes 176, 178, 180. Variable displacement hydraulic rotational unit 166 transfers torque to mechanical transmission 172 using mechanical shaft 168 and mechanical coupling 170.

Figure 4A:
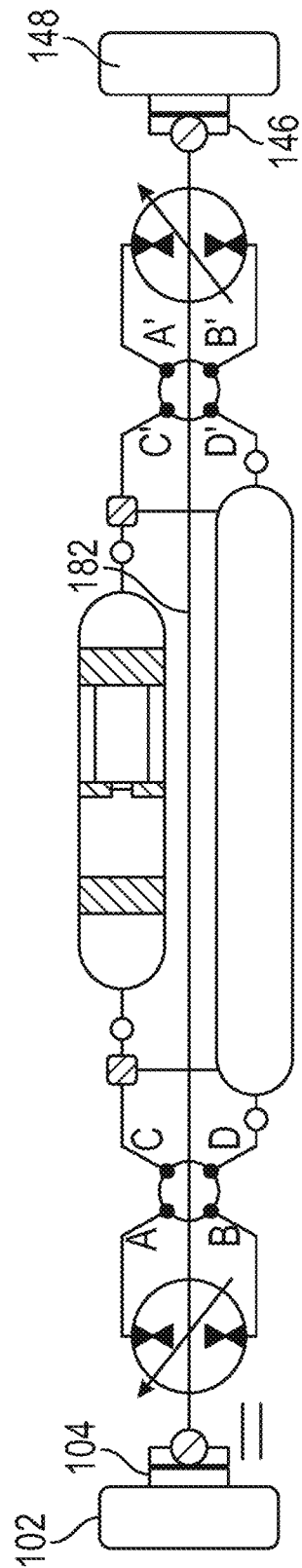
FIGS. 4A and 4B are schematic views of the Renewable Energy and Waste Heat Harvesting System with double action functionality showing structures having an integrated direct mechanical transmission.

Referring now to FIG. 4A, in some implementations, the Renewable Energy and Waste Heat Harvesting System includes an integrated mechanical transmission with a direct mechanical torque transfer path. In this implementation, the direct mechanical torque transfer path is a torque transfer shaft 182 between two rotational mechanical transmissions 102 and 148 that are directly connected to mechanical couplings 104 and 146. The torque transfer shaft 182 is connected to the rotational mechanical transmissions 102 and 148 without intermediate hydraulic energy conversion. The mechanical design of the accumulator unit and hydraulic units relies on creating a hollow path for torque transfer shaft 182.

Figure 4B:
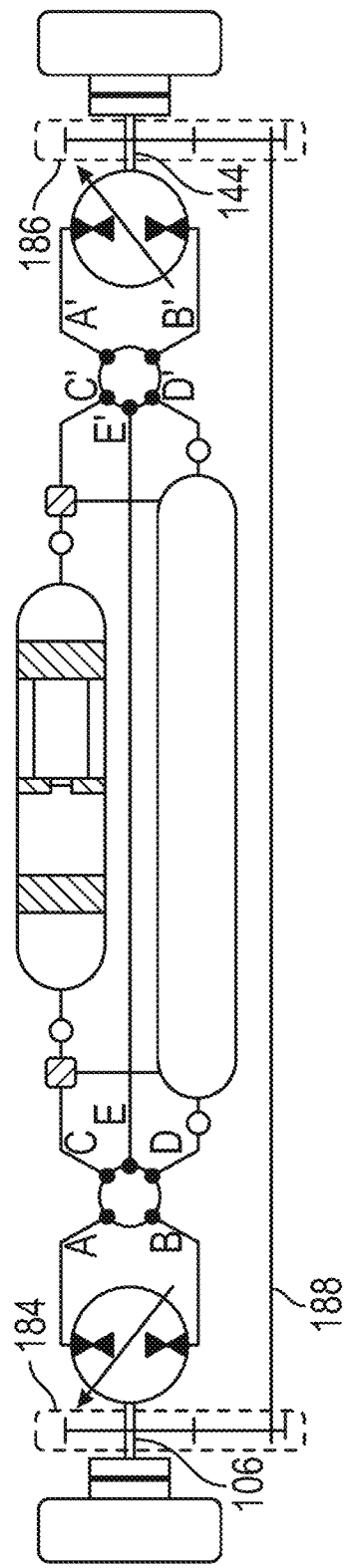

Referring now to FIG. 4B, in some implementations, the Renewable Energy and Waste Heat Harvesting System includes an integrated power split transmission. In this implementation, the integrated power split transmission includes the additional components of gear set 184 rigidly connected to mechanical shaft 106 and gear set 186 rigidly connected to mechanical shaft 144. The outputs of gear sets 184 and 186 are connected by mechanical shaft 188. In this implementation, the torque transfer may be continuously adjusted by adjusting the displacement of the variable displacement hydraulic rotational units 108 and 142.

Figure 5B:
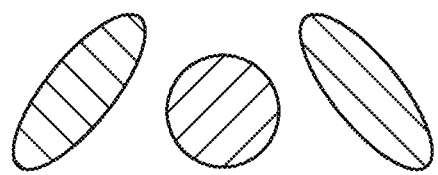
FIGS. 5A and 5B is a schematic view of the Renewable Energy and Waste Heat Harvesting System with double action functionality showing a structure having an integrated power split transmission
Figure 5A:
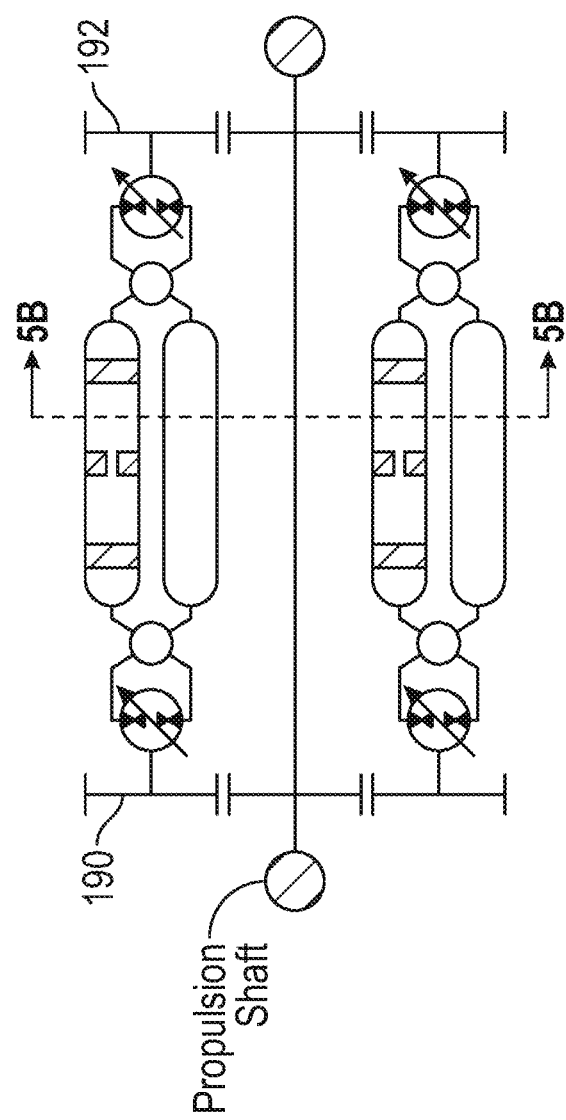

Referring now to FIGS. 5A and 5B, some implementations of the double action Renewable Energy and Waste Heat Harvesting System have a multiple hydraulic unit configuration. With regard to the implementation depicted in FIG. 5A, the core assembly of Renewable Energy and Waste Heat Harvesting System includes two hydraulic power and control units and the included accumulator units. Additional core assemblies of Renewable Energy and Waste Heat Harvesting System may be linked to the propulsion shaft by gear sets in a modular manner to create flexible, larger energy storage and conversion capacities. Specifically, FIG. 5A illustrates the connection of two core assemblies of Renewable Energy and Waste Heat Harvesting System to propulsion shafts using gear sets 190 and 192. FIG. 5B shows a sectional view A-A of the core Renewable Energy and Waste Heat Harvesting System. This view illustrates how the Renewable Energy and Waste Heat Harvesting System may be positioned to meet packaging constraints.

Referring now to FIGS. 6A and 6B, an implementation of the Renewable Energy and Waste Heat Harvesting System is shown with additional core assemblies. The additional core assemblies integrate the propulsion shafts using gear sets 194, 196, 198 and 200.

Figure 7:
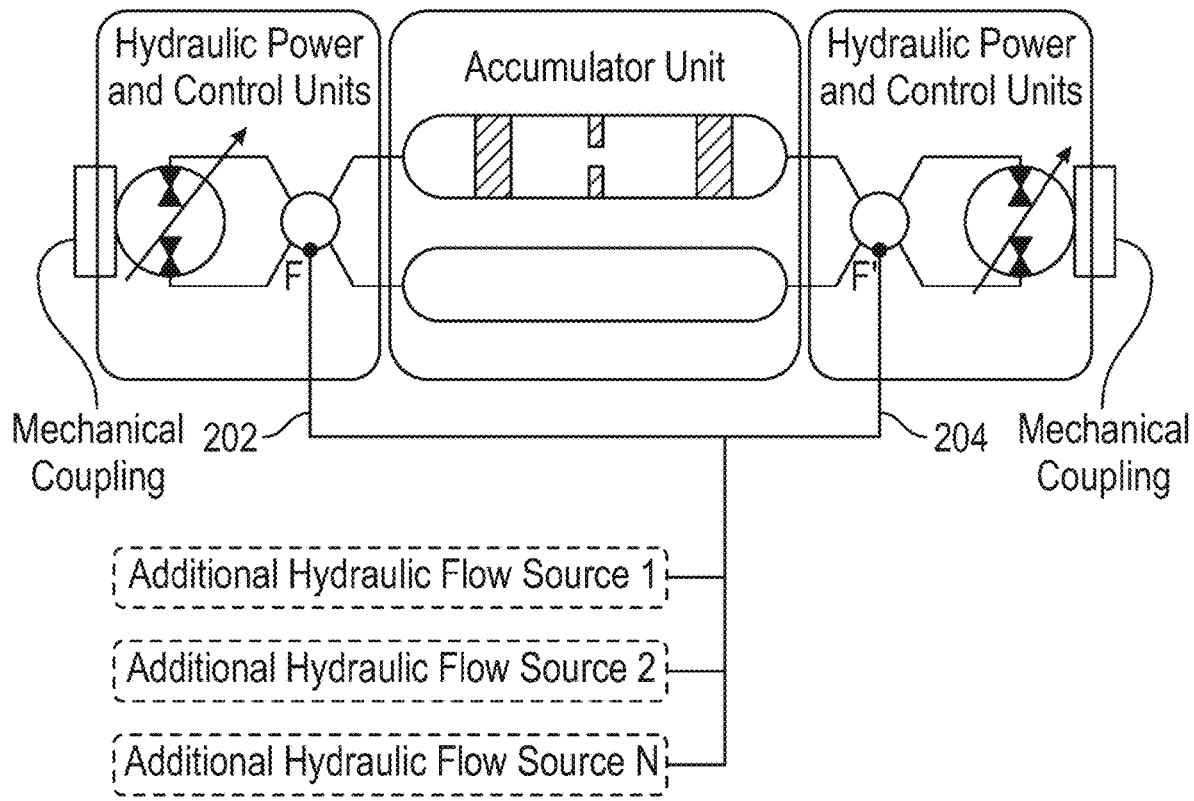
FIG. 7 is a schematic view of the Renewable Energy and Waste Heat Harvesting System with double action functionality showing integration of multiple additional hydraulic sources.

FIG. 7 illustrates an implementation of the Renewable Energy and Waste Heat Harvesting System with double action functionality that integrates an additional hydraulic source. In some implementations, additional hydraulic flow sources may be incorporated to integrate the additional hydraulic source with the Renewable Energy and Waste Heat Harvesting System. In such implementations, hydraulic pipes 202 and 204 provide a connection from the additional hydraulic flow sources to the directional valves of Renewable Energy and Waste Heat Harvesting System using additional ports F and F'.

In implementations in which additional hydraulic sources are available, as well as additional Renewable Energy and Waste Heat Harvesting Systems to be connected, the additional hydraulic sources are connected in parallel. An example of a multiple additional hydraulic flow source application is a combined wind wave application as described in related U.S. Provisional patent application, Ser. No. 62/606,521, filed Sep. 26, 2017, entitled "Integrated Renewable Energy and Waste Heat Harvesting System," which is incorporated by reference herein in its entirety, and to which priority is claimed. This application also claims priority to U.S. Provisional patent application, Ser. No. 62/498,336, filed Dec. 21, 2016, entitled "Variable Sonic Resonator for Fluid Power applications," which is incorporated by reference herein in its entirety.

Figure 8:
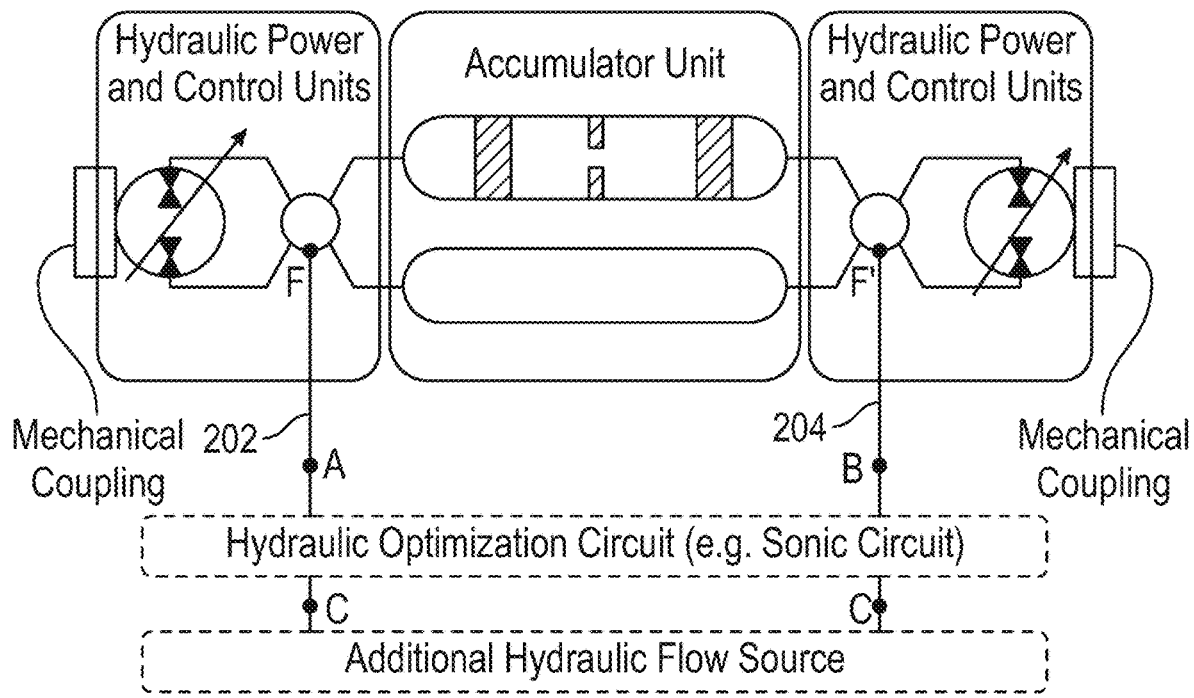
FIG. 8 is a schematic view of the Renewable Energy and Waste Heat Harvesting System with double action functionality showing integration of a hydraulic optimization circuit and additional hydraulic sources.

Referring now to FIG. 8, to improve hydraulic performance, a generic hydraulic optimization circuit is included between the basic additional hydraulic flow source and the Renewable Energy and Waste Heat Harvesting System. An example of a hydraulic optimization circuit is a sonic circuit as described in related U.S. patent application Ser. No. 15/731,360, filed Jun. 1, 2017, entitled "Thermo-Hydraulic Pressure Wave Based Propulsion System," which is incorporated by reference in its entirety.

In some implementations of the Renewable Energy and Waste Heat Harvesting System, the system harvests energy from wind energy sources, wave energy sources, solar energy sources, waste-heat energy sources, electrical energy sources, hydraulic energy sources, mechanical energy sources, or combinations thereof. In some implementations, the Renewable Energy and Waste Heat Harvesting System employs a system architecture similar to the structures disclosed in the following patent applications: (1) "Integrated Hybrid Energy Conversion and Storage System," U.S. Ser. No. 15/731,267, filed May 15, 2017, (2) "Integrated Hybrid Energy Conversion and Storage System," U.S. Ser. No. 62/606,511, filed Sep. 26, 2017; (3) "Hydraulic Accumulator," U.S. Ser. No. 62/577,630, filed Oct. 26, 2017; and (4) "Integrated Renewable Energy and Waste Heat Harvesting System," U.S. Ser. No. 62/606,521, filed Sep. 26, 2017, all of which are incorporated by reference herein in their entireties.

Additionally, U.S. provisional patent application nos. 62/496,784, filed Oct. 28, 2016; 62/498,349, filed Dec. 21, 2016; 62/498,348, filed Dec. 21, 2016; 62/498,347, filed Dec. 21, 2016; 62/498,338, filed Dec. 21, 2016; 62/498,337, filed Dec. 21, 2016; 62/498,336, filed Dec. 21, 2016; 62/605,291, filed Aug. 7, 2017; 62/605,283, filed Aug. 7, 2017; 62/606,522, filed Sep. 26, 2017; 62/580,360, filed Nov. 1, 2017; 62/584,650, filed Nov. 10, 2017; 62/598,366, filed Dec. 13, 2017; and 62/598,364, filed Dec. 13, 2017; as well as U.S. non-provisional patent application Ser. No. 15/731,383, filed Jun. 5, 2017; Ser. No. 15/731,360, filed Jun. 1, 2017; and Ser. No. 15/731,271, filed May 15, 2017; PCT application no. PCT/US17/58883, filed Oct. 27, 2017, are hereby incorporated herein by reference in their entireties.

Figure 9:
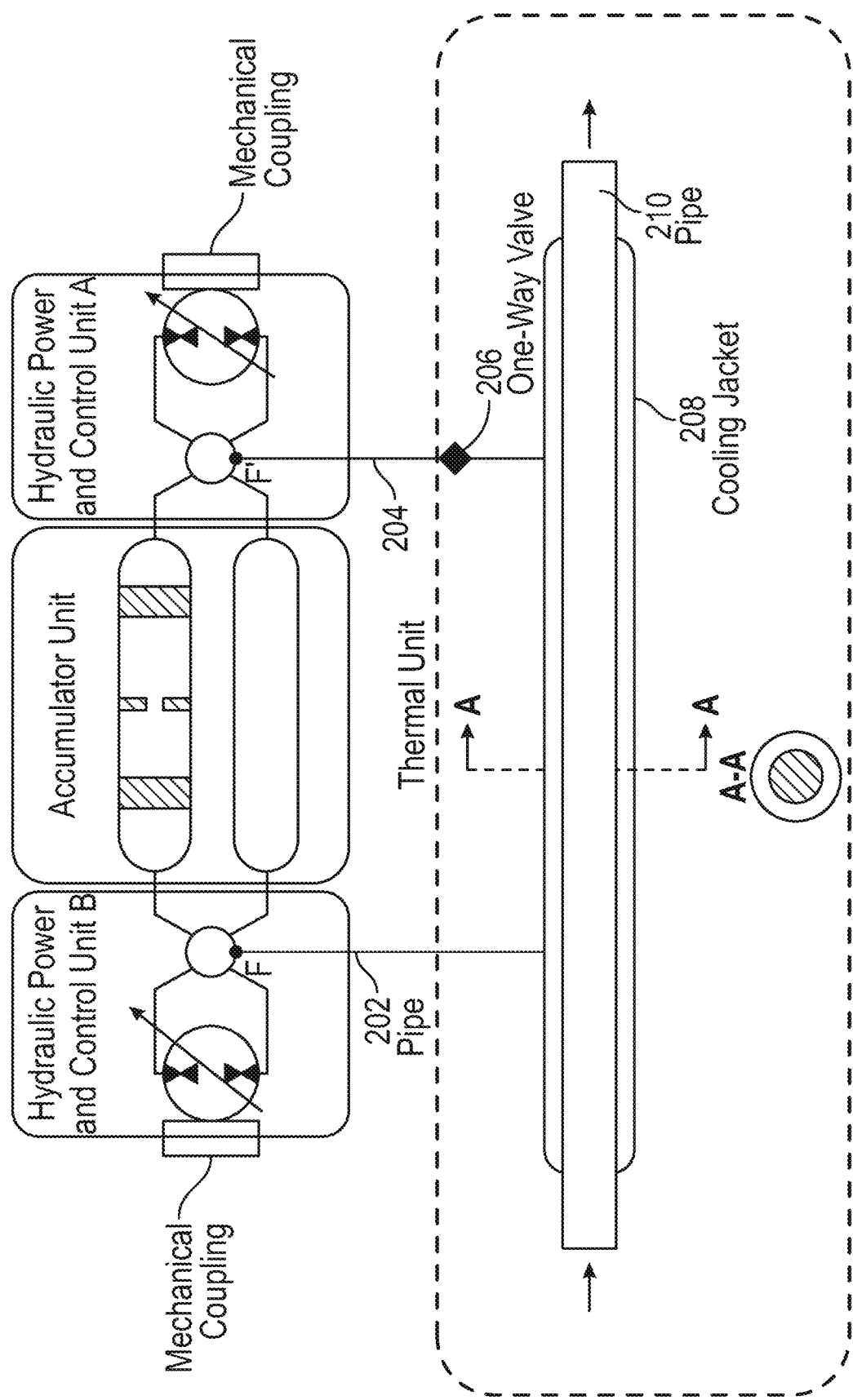
FIG. 9 is a schematic view of the Renewable Energy and Waste Heat Harvesting System with double action functionality showing integration of additional thermal borne hydraulic sources using a tubular structure.

Referring now to FIG. 9, an implementation of a Renewable Energy and Waste Heat Harvesting System is shown with double action functionality that integrates additional thermal hydraulic sources. This implementation adds heat to a flowing media. The flowing media is heated to accumulate energy from an external heat source and release the energy to the hydraulic core system. To implement this cycle, pipe 204 is connected to the port F' of the core Renewable Energy and Waste Heat Harvesting System. The hydraulic power and control unit A acts as hydraulic pump for the thermal unit. The thermal unit includes a hydraulic liquid jacket 208 that has a circular shape and surrounding pipe 210 that is the flow path for the fluid (e.g., gas or liquid) where heat transfer develops, which may be either heating or cooling.

In the implementation of the Renewable Energy and Waste Heat Harvesting System shown in FIG. 9, the outer material of the cooling jacket 208 includes an insulating material. Notably, the pipe assemblies 208 and 210 act as a counter-flow convective-conductive heat exchanger. To create the flow circuit, one-way valve 206 provides the flow path from hydraulic power and control unit A, which acts as a hydraulic pump, to the directional control valve of the hydraulic power and control unit B via port F. At the hydraulic power and control unit B, the thermally energized liquid is directed to the accumulator unit or the variable displacement power unit which acts as a hydraulic motor. An example of a convective-conductive hydraulic heat exchanger is described in Ser. No. 15/731,360, filed Jun. 1, 2017, which is incorporated by reference above.

Figure 10:
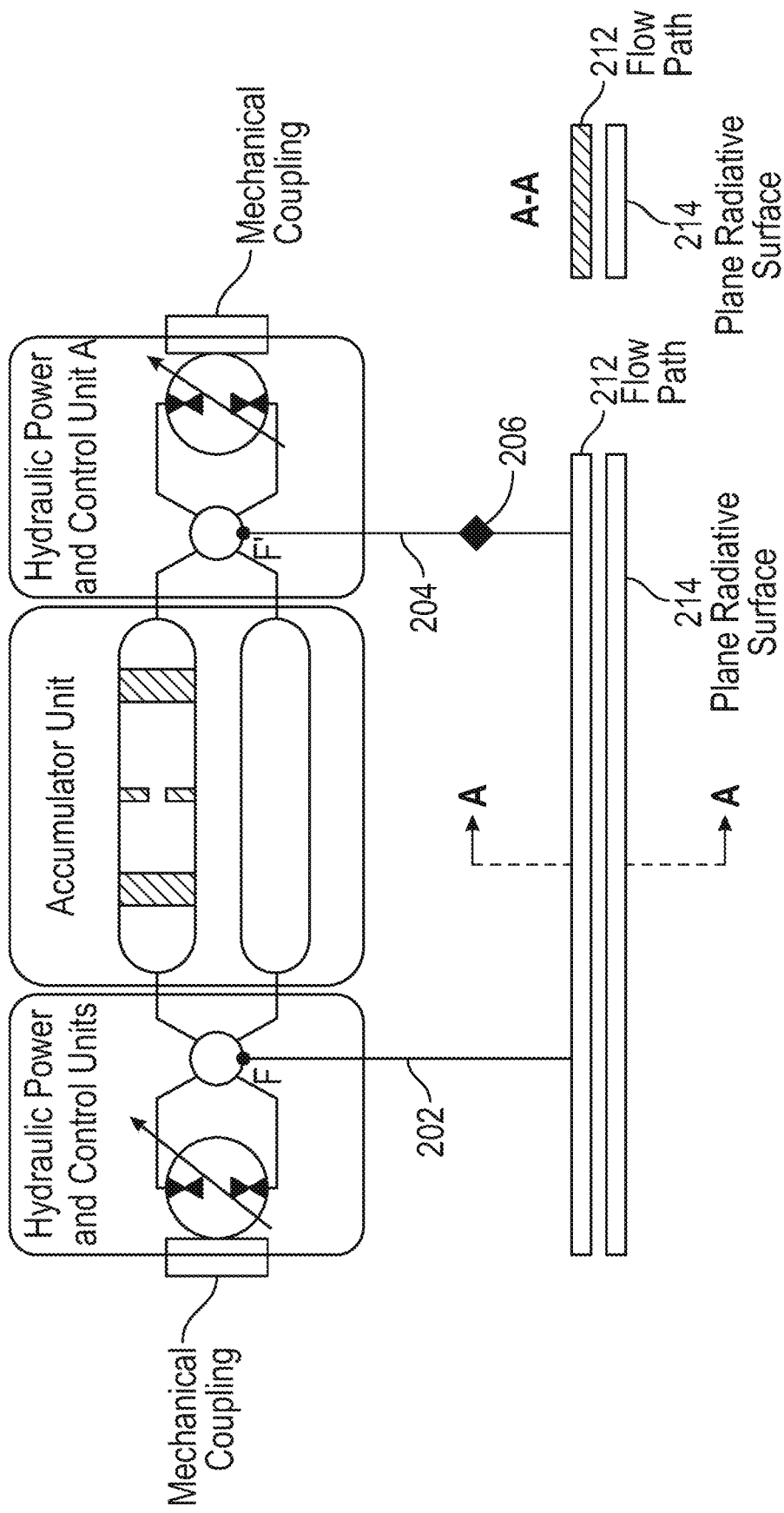
FIG. 10 is a schematic view of the Renewable Energy and Waste Heat Harvesting System with double action functionality showing integration of additional thermal borne hydraulic sources using a planar/surface structure.

Referring now to FIG. 10, in some implementations of the Renewable Energy and Waste Heat Harvesting System, a radiative heat source is integrated into the system. In one such implementation, plane radiative surface 214 is placed in front of rectangular flow space 212 as shown in sectional view A-A, for a maximum radiative view factor. The flow space contains the fluid that is driven by the hydraulic power and control unit A towards the accumulator unit and/or the hydraulic power and control unit B.

Figure 11:
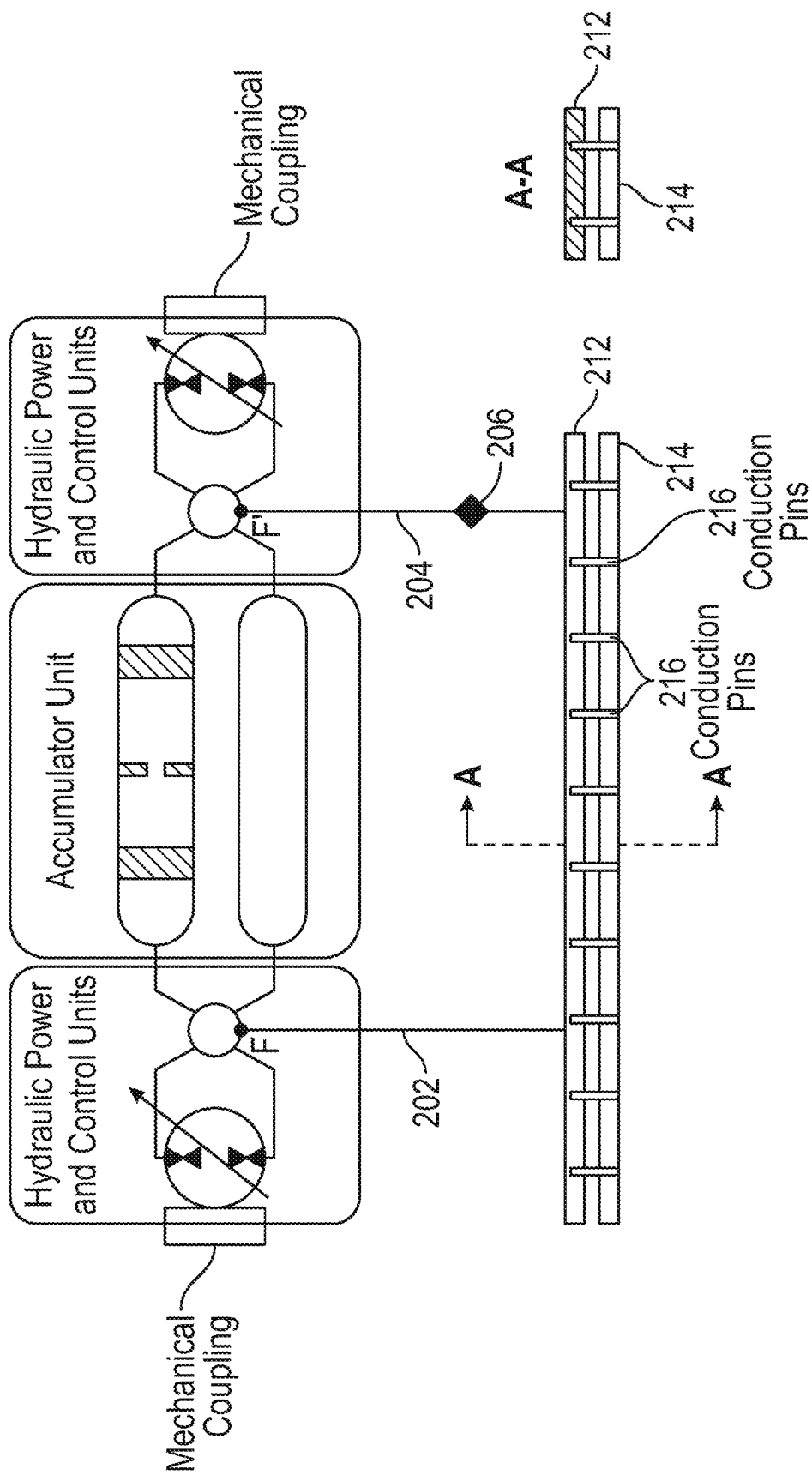
FIG. 11 is a schematic view of the Renewable Energy and Waste Heat Harvesting System with double action functionality showing integration of additional thermal borne hydraulic sources using a planar/surface structure having additional conduction support.

As shown in the implementations of the Renewable Energy and Waste Heat Harvesting System of FIG. 11, conduction heat transfer from the radiative surface may be enhanced by using conduction pins 216, which are placed in contact with the hot surface 214, and integrated within flow path 212. The conduction pins 216 increase the contact surface of the work liquid with the heat source, thereby generating a combined radiative-conduction heat source. An example of a radiative conductive hydraulic heat exchanger is described in Ser. No. 15/731,360, filed Jun. 1, 2017, as incorporated by reference above.

Figure 12:
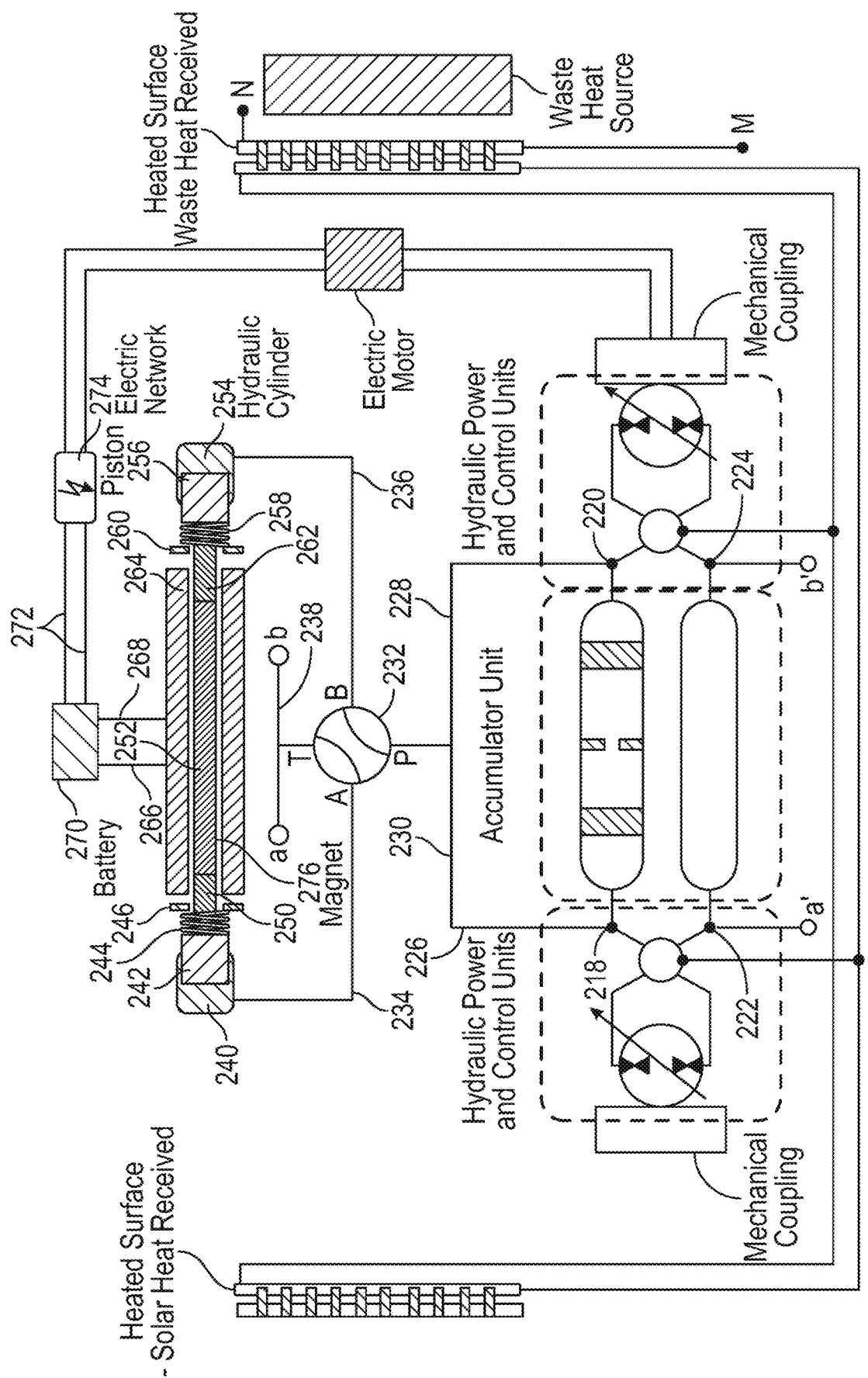
FIG. 12 is a schematic view of the Renewable Energy and Waste Heat Harvesting System with double action functionality showing integration of an electrical linear generator based on a solid magnetic element or on magneto-hydrodynamics, and further including two thermal panels connected in parallel to the system, one panel being configured to harvest solar energy and the other panel being configured to harvest waste heat energy.

Referring now to FIG. 12, some implementations of the Renewable Energy and Waste Heat Harvesting System with double action functionality additionally include an integrated electrical generator. In such an implementation, the Renewable Energy and Waste Heat Harvesting System is expanded with an integrated electrical system to store energy by electrical matter, as well as to feed an electrical consumer or network. Some such implementations of the Renewable Energy and Waste Heat Harvesting System incorporate an alternating linear generator. In the implementation shown in FIG. 12, the alternating linear generator includes a magnetic core 252 that is mounted rigidly to hydraulic pistons 250 and 262. The magnetic core 252 is surrounded by an electromagnetic coil 264. Accordingly, electrical current is induced due to linear alternating displacement of magnetic core 276. The induced current is directed to an electrical storage media (battery) 270 using electrical wires 266 and 268. Additionally, the electrical storage media 270 is connected to an electrical actuator or an electrical network 274 using electrical wires 272.

In some implementations, pressure from the hydraulic circuit actuates hydraulic pistons 242 and 256 which generate the alternating linear displacement of the magnetic element 252 between the hydraulic cylinders 240 and 254. The neutral position of magnetic core 252 is maintained by spring 244 acting between hydraulic piston 242 and rigid fixed wall 246, and spring 258 acting between hydraulic piston 256 and rigid fixed wall 260. The hydraulic cylinders are connected to Renewable Energy and Waste Heat Harvesting System using hydraulic valves 218 and 220 connected to the high pressure accumulator of the accumulator unit, and hydraulic valves 222 and 224 are connected to the low pressure accumulator of the accumulator unit. High pressure pipes 226 and 228 are linked by hydraulic pipe 230, and are connected to port P of rotational valve 232. During rotation, the rotational valve 232 provides two different connection combinations. The first connection combination is P-A and B-T at the same time. The second connection combination is P-B and A-T at the same time.

Referring still to FIG. 12, in some implementations of the Renewable Energy and Waste Heat Harvesting System, Port A is connected via hydraulic pipe 234 to hydraulic cylinder 240, and Port B is connected via hydraulic pipe 236 to hydraulic cylinder 254. Additionally, Port T is connected to central pipe 238, which provides a connection at the low pressure accumulator of the accumulator unit by the hydraulic connectors a-a' and b-b'.

In at least one implementation of the Renewable Energy and Waste Heat Harvesting System, the magnetic core 252 is actuated using hydraulic fluid from the accumulator unit. The hydraulic fluid from the accumulator unit is directed to port P of the rotational control valve 232. Due to the rotation of the rotational control valve 232, the liquid at port P is directed alternately to ports A and B. Consequently, the pistons 242 and 256 generate the alternating displacement of the magnetic core 252, which is fixed to the pistons 242 and 256. Concurrently, the rotational control valve 232 provides alternating connection of Port B to alternatively T and alternatively A to alternatively T, which releases liquid at the end of the stroke from hydraulic cylinders 240 and 254, to the low pressure accumulator of the accumulator unit. In some implementations, the magnetic core 252 is an electro-magnetic-suitable liquid which is actuated within housing 276 by hydraulic pistons 250 and 262 to induce electrical current into the coil 264.

Additionally, FIG. 12 shows two thermal panels connected in parallel to the Renewable Energy and Waste Heat Harvesting System to capture thermal energy from solar or waste heat. Notably, thermal energy may be integrating onto any source generated by convection, conduction or radiation. In this implementation, one set of thermal panels is dedicated to harvesting solar energy and the other set of thermal panels is dedicated to harvesting waste heat energy. The waste heat thermal panels are placed in parallel to the waste heat source to capture the maximum heat by radiation. As discussed above with reference to FIG. 11, conduction heat transfer from the radiative surface may be enhanced by using conduction pins, which are placed in contact with the hot surface, and integrated within the waste heat thermal panels. Examples of waste heat energy sources relying on radiative processes are exhaust pipes, heated engines or other components in vehicles during use; heated metals in industrial processes (e.g., metals prepared for forging, buildings, industrial ovens); and cooling towers of thermal electrical plants. Correspondingly, the solar heat thermal panels are placed in parallel to the solar heat source to capture the maximum heat by radiation. As discussed above, conduction heat transfer from the radiative surface may be enhanced by using conduction pins, which are placed in contact with the hot surface, and integrated within the solar heat thermal panels.

In some implementations, waste heat is available as a hot fluid, such as flue gas, steam, or water from geothermal, nuclear, equipment cooling hydraulic circuits, or other sources. As shown in FIG. 12, in some such implementations, the hot fluid enters the heated surface waste heat component at pipe connection M and leaves the heated surface waste heat component a-t hydraulic connector N.

Figure 13:
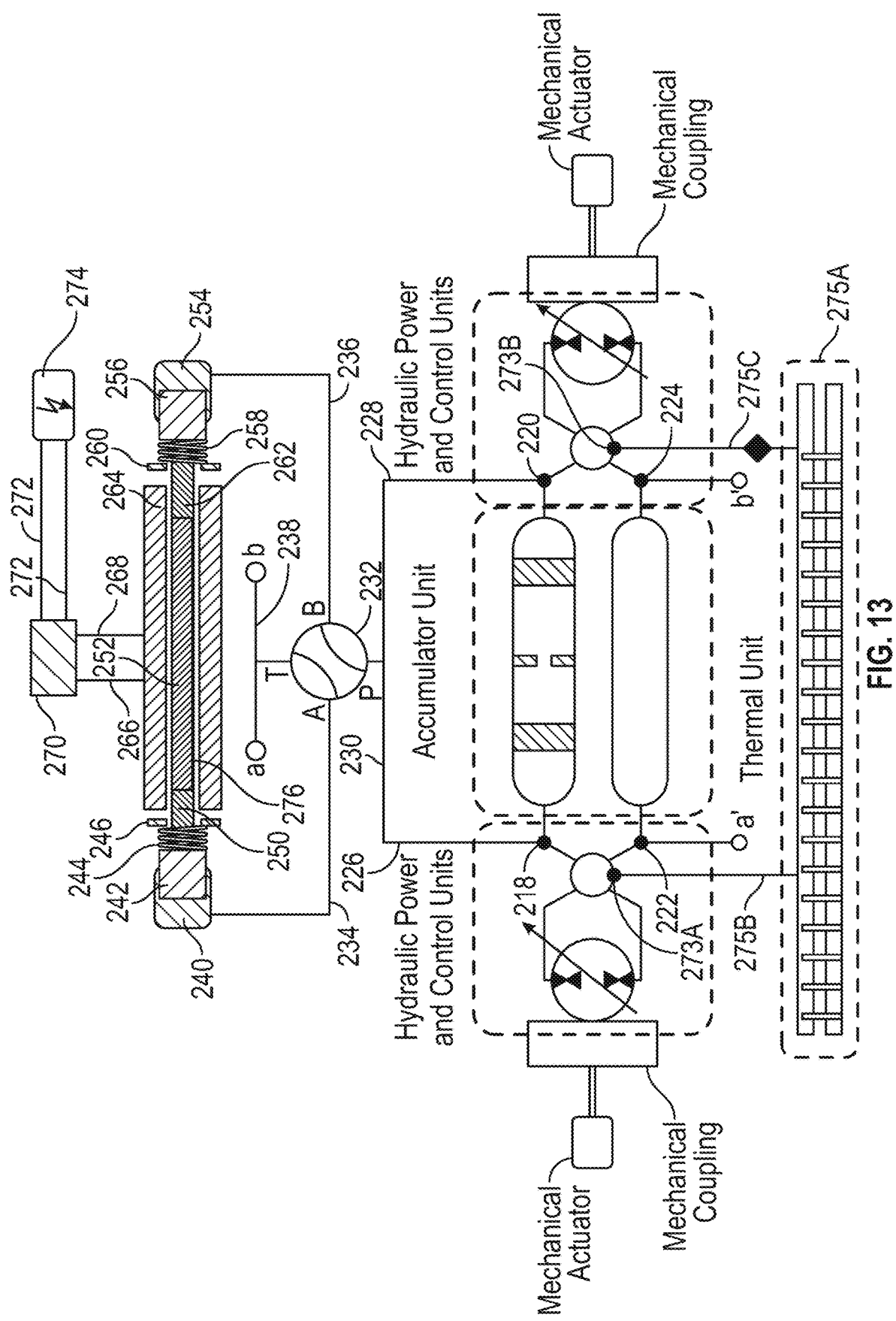
FIG. 13 is a schematic view of Renewable Energy and Waste Heat Harvesting System integrating mechanical and thermal energy sources for mechanical and electrical power supply.

Referring now to FIG. 13, the general Renewable Energy and Waste Heat Harvesting System structure further integrates a thermal energy source 275A. The thermal energy source 275A has a mechanical interface 275B and an electrical interface 275C. The thermal energy source 275A connects via the mechanical interface 275B and the electrical interface 275C to the directional control valves of the Hydraulic Power and Control Units via ports 273A and 273B.

Figures 14A, 14B, 14C:
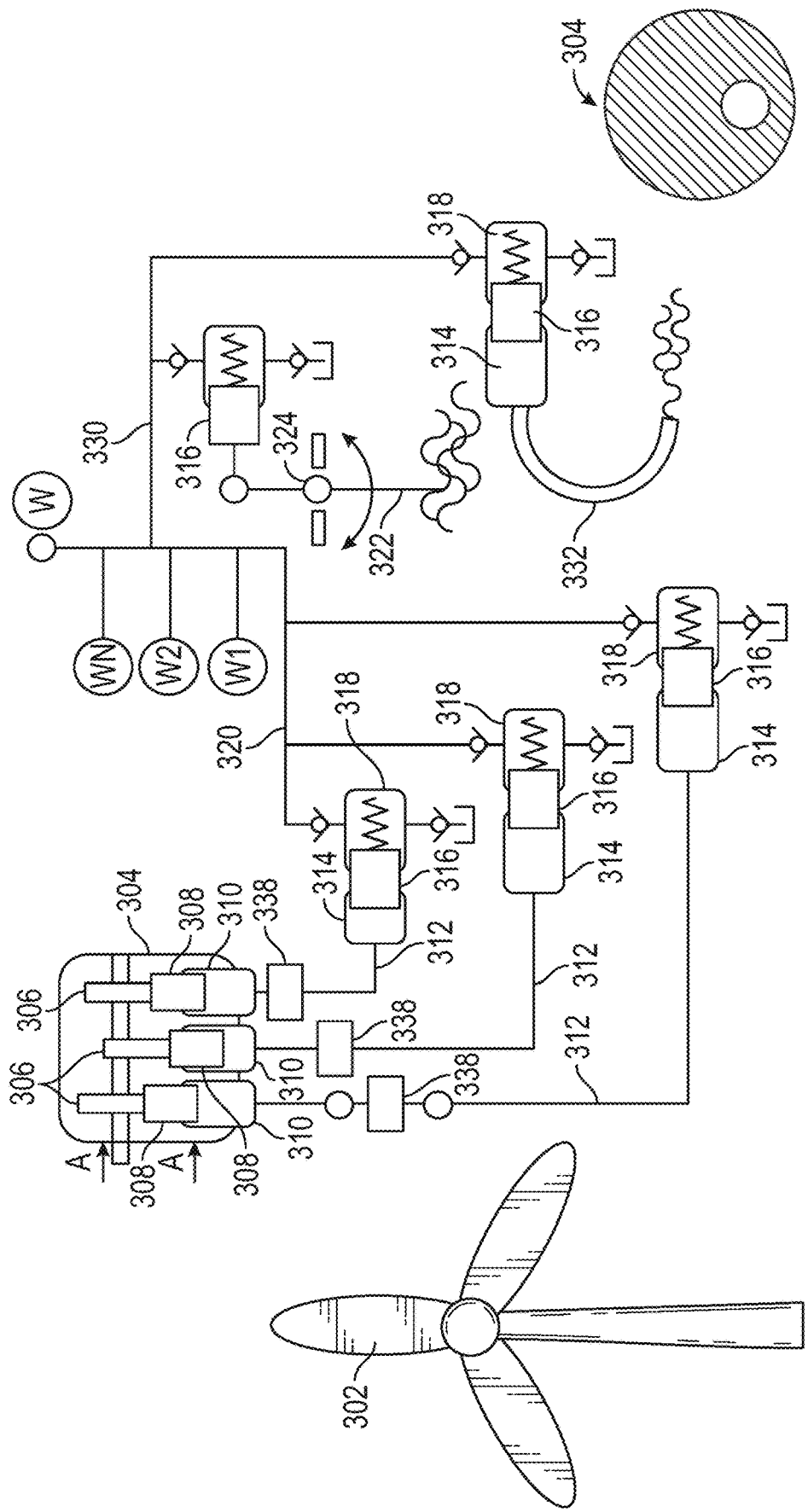
FIG. 14A is a pictorial view of a wind-driven propeller, as an example of a renewable energy source for use with a Renewable Energy and Waste Heat Harvesting System.
FIG. 14B is a schematic view of an energy circuit that includes wind-generated and marine wave-generated hydraulic energy inputs to a Renewable Energy and Waste Heat Harvesting System.
FIG. 14C is a cross-sectional view of an exemplary cam assembly for use in harvesting renewable energy from the wind-driven propeller shown in FIG. 3A with a Renewable Energy and Waste Heat Harvesting System.

Referring now to FIGS. 14A, 14B and 14C, in some implementations, the Renewable Energy and Waste Heat Harvesting System integrates wind and marine wave generated hydraulic energy. In one such implementation, the circuit in FIG. 12 is connected with the circuit in FIG. 14B, at connection point "W." In some implementations, the Renewable Energy and Waste Heat Harvesting System further includes a wind driven propeller 302 that drives a shaft 304. The shaft 304 has an attached a plurality of cams 306 (e.g., three cams shown in FIG. 14B) that drive generator side pistons 308. The drive generator side pistons 308 are positioned in generator side hydraulic cylinders 310, which are in turn connected to the receiver hydraulic cylinders 314, via pipes 312. The receiver hydraulic cylinders 314 house the receiver hydraulic pistons 316 of piston pumps 318. The receiver hydraulic pistons 316 are actuated to drive hydraulic liquid through pipe network 320 to the connection point "W." In this manner, additional wind turbines also may be connected to the Renewable Energy and Waste Heat Harvesting System at a plurality of connection points "$W_1, W_2 \ldots W_n$."

Referring still to FIG. 14B, in some implementations, the Renewable Energy and Waste Heat Harvesting System is configured to capture marine wave energy. In such an implementation, the system includes a plate 322 that is driven by the marine waves. Due to leverage component 324, the motion of the plate 322 by the marine waves actuates piston 316 of a hydraulic piston pump 318. The actuating piston 316 delivers hydraulic liquid to connection point "W."

In another implementation, the Renewable Energy and Waste Heat Harvesting System includes a pipe 332 through which marine waves enter. The marine waves enter within a hydraulic cylinder 314 and actuate a hydraulic piston 316 of hydraulic piston pump 318. The actuation of the hydraulic piston 316 delivers hydraulic liquid to the connection point "W" using pipe network 330.

Figure 15:
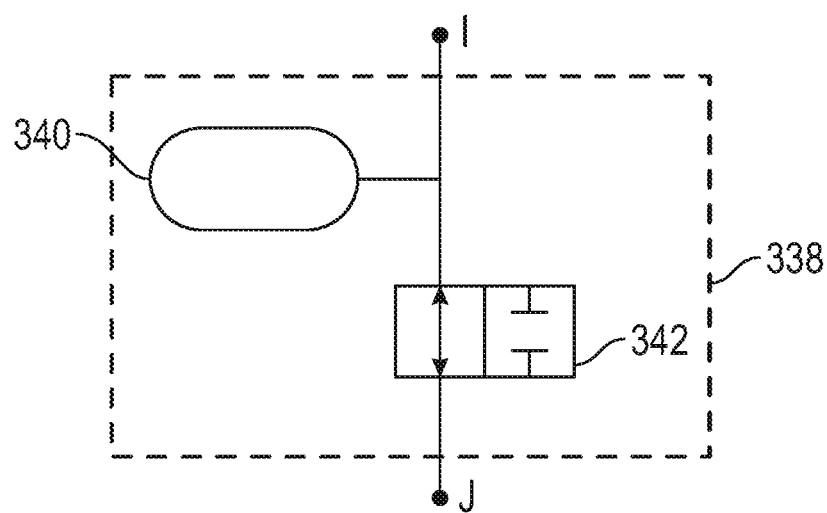
FIG. 15 is a schematic view of a resonator configured to improve the efficiency of energy transfer from a wind turbine generator to one or more piston pumps with a Renewable Energy and Waste Heat Harvesting System.

Referring now to FIG. 15, a resonator 338 is positioned on pipes 312 to improve the efficiency of energy transfer from the wind turbine generator to the piston pumps. In some implementations, the resonator 338 includes a hydraulic accumulator 340 and a 2/2 hydraulic valve 342, which opens and closes alternately at a given frequency. The hydraulic accumulator 340 may be of the type described in U.S. Provisional patent application Ser. No. 62/577,630, entitled "Hydraulic Accumulator." In some implementations, the resonator 338 enables energy to be transferred between the generator and the receiver side in a highly efficient manner by correlating liquid and piston mass, the spring rate of the piston pump, and the actuation frequency of the 2/2 hydraulic valve 342.

The accumulator 340 performs the function of damping and reduction of wave amplitudes, by accumulating (i.e., removing) energy during a pressure peak (relative to a mean pressure level) and releasing the energy during a pressure low (relative to a mean pressure level). Waves are generated by system actuation. Constant flow is needed to provide accurate control. Control may be disrupted by reflecting and interfering waves. Accordingly, the positioning of an accumulator 340 in the hydraulic control circuit, enables the accumulator 340 to eliminate perturbation effects in the main control system.

Figure 16:
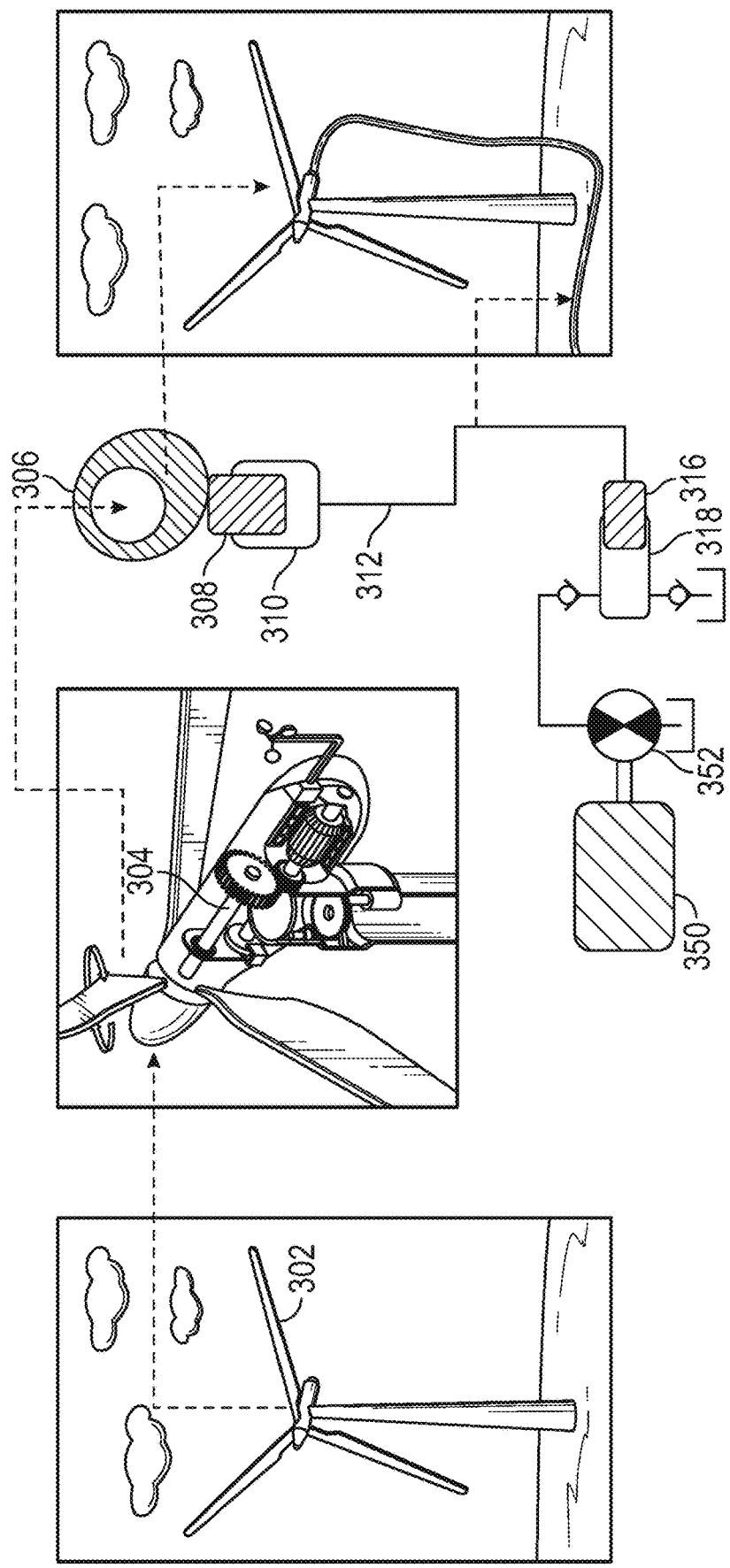
FIG. 16 is a pictorial view of a wind-driven propeller, as an example of a renewable energy source for use with a Renewable Energy and Waste Heat Harvesting System.

As shown in the windmill implementation in FIG. 16, in some embodiments of the Renewable Energy and Waste Heat Harvesting System, the wind turbine 302 includes a shaft 304 that actuates the cam 306. The cam 306 drives a side piston 308 that is positioned in a hydraulic cylinder 310. The hydraulic cylinder 310 is connected to the pipe 312. At ground level, the pressure waves in the pipe 312 actuate a spring-loaded piston 316 as a core element of a piston pump 318 that propels a rotational electric generator 350 via a hydraulic motor 352.

The windmill implementation of the Renewable Energy and Waste Heat Harvesting System provides the technological improvement of a simpler design, which is simpler to produce and, thus, provides reduced mounting costs and reduced maintenance costs. Additionally, the implementations described above enable multiple windmills to be connected to and generate energy for one generator, thus, increasing efficiency and reducing costs. Notably, the Renewable Energy and Waste Heat Harvesting System may be retrofitted to existing windmills. The Renewable Energy and Waste Heat Harvesting System provides the further technological improvement of enabling use at any wind speed, and applicability at any windmill size.

Regarding wind turbine implementations, the Renewable Energy and Waste Heat Harvesting System provides extended wind power range in terms of high and low wind speeds. A plurality of wind turbines can be operatively coupled to a common generator positioned on the ground, which enables more uniform operating conditions for the electrical generator in the Renewable Energy and Waste Heat Harvesting System. Notably, the Renewable Energy and Waste Heat Harvesting System achieves increased efficiency by coupling a sonic resonator for energy transfer between the wind turbine tower and the generator.

Regarding wave generator implementations, the Renewable Energy and Waste Heat Harvesting System is able to harvest energy from marine waves. Traditionally, harvesting energy from marine waves has been difficult due to their fluctuating character. Additionally, ocean waves are associated with a corrosive medium (i.e., salt water), which makes it difficult to maintain system components that are in constant contact with such a corrosive medium. Furthermore, placing an electrical generator off-shore is a costly challenge. The Renewable Energy and Waste Heat Harvesting System relies on the transmission of the hydraulic energy of the marine waves, intermediate storage, and conversion of the energy onshore. Alternatively, some implementations of the Renewable Energy and Waste Heat Harvesting System may combine this harvested wave energy with wind turbine generated energy in a common intermediate energy storage system that supplies an electrical generator.

Regarding solar systems implementations, the Renewable Energy and Waste Heat Harvesting System collects solar heat in the same manner as waster heat as described above with respect to FIG. 12. A photovoltaic system is used to directly generate electrical energy. Traditionally, the lack of an efficient conversion of liquid thermal energy heated by solar energy to a storage system, has reduced the efficiency and usefulness of solar energy harvesting systems. Such conventional systems have relied on integrating and converting solar-heated liquid into intermediate hydro-mechanical energy for storage.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   an accumulator unit configured to store and release hydraulic fluid, wherein the accumulator unit comprises a high pressure accumulator and a low pressure accumulator separate from the high pressure accumulator;
   a first variable displacement hydraulic rotational unit;
   a first control valve comprising a plurality of ports coupled to the first variable displacement hydraulic rotational unit, the accumulator unit, and an energy input;
   a second variable displacement hydraulic rotational unit;
   a second control valve comprising a plurality of ports coupled to the second variable displacement hydraulic rotational unit, the accumulator unit, and the energy input;
   a pressure valve coupled to the low pressure accumulator by a connection pipe; and a hydraulic connector that couples the high pressure accumulator and the pressure valve to enable hydraulic fluid to be released if peak loads occur.

2. A system, comprising:

an accumulator unit configured to store and release hydraulic fluid;

a first variable displacement hydraulic rotational unit;

a first control valve comprising a plurality of ports coupled to the first variable displacement hydraulic rotational unit, the accumulator unit, and an energy input;

a second variable displacement hydraulic rotational unit;

a second control valve comprising a plurality of ports coupled to the second variable displacement hydraulic rotational unit, the accumulator unit, and the energy input; and a controller configured to:
regulate transfer of energy in the accumulator unit; and
direct the hydraulic fluid to the first and second variable displacement hydraulic rotational units via the first and second control valves.

3. A method comprising:

receiving energy in hydraulic fluid from an energy input at a first port of a first control valve and at a first port of a second control valve;

transferring the energy in the hydraulic fluid from the first ports of the first and second control valves to an accumulator unit;

storing the energy in the accumulator unit;

transferring the energy from the accumulator unit to a second port of the first control valve and to a second port of the second control valve;

transferring the energy from the second ports of the first and second control valves to first and second variable displacement hydraulic rotational units;

wherein the accumulator unit comprises:
a high pressure accumulator; and
a low pressure accumulator separate from the high pressure accumulator, the method further comprising:
transferring the hydraulic fluid from the first and second variable displacement hydraulic rotational units to a third port of the first control valve and to a third port of the second control valve; and
transferring the hydraulic fluid from the third ports of the first and second control valves to the low pressure accumulator.

4. The method of claim 3, further comprising:
enable the hydraulic fluid to be released by a pressure valve coupled to the low pressure accumulator by a connection pipe, if peak loads occur.

5. The method of claim 3, further comprising bypassing the hydraulic fluid using a hydraulic pipe between the low pressure accumulator and the high pressure accumulator.

6. A method comprising:

receiving energy in hydraulic fluid from an energy input at a first port of a first control valve and at a first port of a second control valve;

transferring the energy in the hydraulic fluid from the first ports of the first and second control valves to an accumulator unit;

storing the energy in the accumulator unit;

transferring the energy from the accumulator unit to a second port of the first control valve and to a second port of the second control valve;

transferring the energy from the second ports of the first and second control valves to first and second variable displacement hydraulic rotational units;

regulating, using a controller, a transfer of the energy in the accumulator unit; and directing, using the controller, the hydraulic fluid to the first and second variable displacement hydraulic rotational units via the first and second control valves.

* * * * *